(12) United States Patent
Kurashige

(10) Patent No.: US 10,688,912 B2
(45) Date of Patent: Jun. 23, 2020

(54) ILLUMINATION DEVICE FOR ILLUMINATING AN EXTERIOR SPACE ADJACENT A MOBILE OBJECT

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 203 days.

(21) Appl. No.: 15/527,542

(22) PCT Filed: Nov. 6, 2015

(86) PCT No.: PCT/JP2015/081347
§ 371 (c)(1),
(2) Date: May 17, 2017

(87) PCT Pub. No.: WO2016/088510
PCT Pub. Date: Jun. 9, 2016

(65) Prior Publication Data
US 2017/0334339 A1  Nov. 23, 2017

(30) Foreign Application Priority Data

Dec. 5, 2014  (JP) ................................. 2014-246897

(51) Int. Cl.
*B60Q 1/14* (2006.01)
*F21S 8/00* (2006.01)
(Continued)

(52) U.S. Cl.
CPC ........... *B60Q 1/1423* (2013.01); *B60Q 1/143* (2013.01); *B60Q 1/22* (2013.01); *B60Q 1/24* (2013.01);
(Continued)

(58) Field of Classification Search
None
See application file for complete search history.

(56) References Cited

U.S. PATENT DOCUMENTS 5,477,436 A     12/1995  Bertling et al.
7,377,675 B2 *   5/2008  Pastrick .............. B60Q 1/2665
                                                    359/841
(Continued)

FOREIGN PATENT DOCUMENTS

CN        103402819 A     11/2013
DE          4228895 A1      3/1994
(Continued)

OTHER PUBLICATIONS

English translation of International Preliminary Report on Patentability (Chapter I) (Application No. PCT/JP2015/081347 dated Jun. 15, 2017, 12 pages.

(Continued)

*Primary Examiner* — Edemio Navas, Jr.
(74) *Attorney, Agent, or Firm* — Burr & Brown, PLLC

(57) ABSTRACT

An illumination device includes: a predetermined range illumination section capable of illuminating a predetermined range with illumination light emitted from a mobile object; and an eye direction detection section for detecting the direction of the eyes of a driver of the mobile object and/or the direction of the face of the driver. The predetermined range illumination section controls the distribution of the illumination light or the on/off of the illumination light based on the direction of the eyes of the driver and/or the direction of the face of the driver, detected by the eye direction detection section.

7 Claims, 16 Drawing Sheets

(51) Int. Cl.
  *G02B 5/32* (2006.01)
  *B60Q 1/30* (2006.01)
  *F21S 41/00* (2018.01)
  *F21S 41/16* (2018.01)
  *B60Q 1/24* (2006.01)
  *B60Q 1/22* (2006.01)
  *F21S 41/663* (2018.01)
  *G03H 1/22* (2006.01)
  *F21S 41/675* (2018.01)

(52) U.S. Cl.
  CPC ............... *B60Q 1/30* (2013.01); *F21S 41/00* (2018.01); *F21S 41/16* (2018.01); *F21S 41/663* (2018.01); *B60Q 2300/23* (2013.01); *F21S 41/675* (2018.01); *G02B 5/32* (2013.01); *G03H 1/2202* (2013.01)

(56) References Cited

U.S. PATENT DOCUMENTS

| | | | | |
|---|---|---|---|---|
| 2009/0147080 A1* | 6/2009 | Inada | ............... | G06K 9/00604 348/77 |
| 2011/0249460 A1 | 10/2011 | Kushimoto | | |
| 2013/0076881 A1* | 3/2013 | Takahashi | .......... | G06K 9/00268 348/77 |
| 2013/0170007 A1* | 7/2013 | Kurashige | ............... | G02B 5/32 359/24 |
| 2014/0071702 A1 | 3/2014 | Faber et al. | | |

FOREIGN PATENT DOCUMENTS

| | | |
|---|---|---|
| JP | 2012-123381 A1 | 6/2012 |
| JP | 2012-146621 A1 | 8/2012 |
| JP | 2014-004882 A1 | 1/2014 |
| JP | 2014004882 A * | 1/2014 |
| JP | 2014-191304 A1 | 10/2014 |
| WO | 2010/058323 A1 | 5/2010 |

OTHER PUBLICATIONS

International Search Report and Written Opinion (Application No. PCT/JP2015/081347) dated Feb. 2, 2016.
European Search Report, European Application No. 15866029.0, dated Jul. 24, 2018 (23 pages).
Chinese Office Action (Application No. 201580065994.8) dated Jan. 24, 2019 (with English translation).
Japanese Office Action (Application No. 2016-562359) dated Sep. 3, 2019 (with English translation).
Chinese Office Action (Application No. 201580065994.8) dated Nov. 4, 2019 (with English translation).
Indian Office Action (Application No. 201717018791) dated Dec. 16, 2019 (with English translation).

* cited by examiner (A)

(B)

(A)

(B)

ILLUMINATION DEVICE FOR ILLUMINATING AN EXTERIOR SPACE ADJACENT A MOBILE OBJECT

BACKGROUND OF THE INVENTION

Field of the Invention

The present invention relates to an illumination device to be installed in a mobile object.

Description of Related Art

Various techniques have been proposed regarding illumination devices to be installed in mobile objects such as vehicles. For example, patent document 1 discloses a vehicular illumination device including a light source for emitting coherent light, and a hologram element which, when irradiated with the coherent light, reconstructs diffracted light. The illumination device illuminates an area around a vehicle with the diffracted light from the hologram element. The light source for emitting coherent light generally has a high emission intensity, and therefore has the advantage that the optical system of the illumination device can be made small-sized even when securing of sufficient emission intensity is desired. Further, the coherency of coherent light to be emitted by the light source makes it possible to finely control the distribution of the light and, in addition, to carry the light over long distances.

PRIOR ART DOCUMENT

Patent Document

Patent document 1: Japanese Patent Laid-Open Publication No. 2012-146621

SUMMARY OF THE INVENTION

Problems to be Solved by the Invention

A driver (operator) of a mobile object, such as an automobile or a motorcycle, drives while visually observing an area forward of the mobile object and other adjacent areas. If it is possible to appropriately illuminate an area the driver wishes to observe during driving, it will assist comfortable driving and improve the safety of driving.

The present invention has been made in view of the above situation. It is therefore an object of the present invention to provide a illumination device which can assist comfortable driving or steering and can improve the safety of driving or steering.

Means for Solving the Problems

In order to solve the above problem, the present invention provides a illumination device to be installed in a mobile object, comprising: a predetermined range illumination section capable of illuminating a predetermined range with illumination light emitted from the mobile object; and an eye direction detection section for detecting the direction of the eyes of a driver of the mobile object and/or the direction of the face of the driver, wherein the predetermined range illumination section controls the distribution of the illumination light or the on/off of the illumination light based on the direction of the eyes of the driver and/or the direction of the face of the driver, detected by the eye direction detection section.

In the illumination device, the predetermined range illumination section may control the distribution of the illumination light or the on/off of the illumination light so that it will illuminate an area, lying in the direction of the eyes of the driver and/or the direction of the face of the driver detected by the eye direction detection section, in the predetermined range.

In this case, the illumination device may further comprise a main illumination section for illuminating a forward main range by emitting forward main illumination light forward from the mobile object; and the predetermined range illumination section may illuminate the predetermined range, which is set outside the forward main range, by emitting the illumination light forward from the mobile object.

In this case, the mobile object may be a vehicle; the forward main range may be set at a range that meets a predetermined light distribution standard for vehicular headlights; and the predetermined range may be set at a range that does not meet the light distribution standard.

In the illumination device, the mobile object may be equipped with a mirror member for reflecting to the driver an area adjacent to the mobile object; the predetermined range illumination section may illuminate an area including the adjacent area which the mirror member reflects to the driver; the eye direction detection section may detect whether or not the driver is viewing the mirror member based on the direction of the eyes of the driver and/or the direction of the face of the driver; and when the eye direction detection section detects the driver viewing the mirror member, the predetermined range illumination section may control the distribution of the illumination light or the on/off of the illumination light so that it will illuminate the adjacent area.

The predetermined range illumination section may include a coherent light source for emitting coherent light, and an optical element for diffusing the coherent light and emitting the illumination light, thereby illuminating the predetermined range; and the optical element may be composed of a plurality of element diffusion areas which each diffuse the incident coherent light, thereby illuminating a partial area in the predetermined range, and at least part of the partial areas to be illuminated by the element diffusion areas differ from each other. The predetermined range illumination section may control the distribution of the illumination light by controlling whether or not to allow the coherent light from the coherent light source to enter the element diffusion areas, or by controlling whether or not to allow the illumination light from the element diffusion areas to enter the predetermined range.

In this case, the predetermined range illumination section may further include a timing controller for controlling the timing of incidence of the coherent light on the optical element or the timing of illumination of the predetermined range. In this case, the illumination device may further comprise a scanning section for allowing the coherent light, emitted by the coherent light source, to scan the optical element. The scanning section may include a light scanning member for periodically changing the traveling direction of the coherent light emitted by the coherent light source. The light scanning member may allow the coherent light from the coherent light source to periodically scan a light entrance surface of the optical element; and the timing controller may control the timing of emission of the coherent light and thus the timing of incidence of the coherent light on the optical element in synchronization with the timing of scanning of the optical element with the coherent light by means of the light scanning member, thereby controlling whether or not to allow the coherent light from the coherent light source to enter the element diffusion areas.

In this case, the optical element may be a hologram recording medium; and the element diffusion areas are element hologram areas having different interference patterns.

The illumination device may be configured as a illumination unit including the main illumination section and the predetermined range illumination section. In this case, the illumination unit may include a coherent light source including a first light source section for emitting first coherent light, and a second light source section for emitting second coherent light, and an optical element having a first diffusion area which the first coherent light enters, and a second diffusion area which the second coherent light enters. The first light source section and the first diffusion area may constitute the main illumination section, and the first diffusion area may diffuse the first coherent light and emit the forward main illumination light, thereby illuminating the forward main range. The second light source section and the second diffusion area may constitute the predetermined range illumination section, and the second diffusion area may diffuse the second coherent light and emit the illumination light, thereby illuminating the predetermined range. In this case, the second diffusion area may be composed of a plurality of second element diffusion areas which each diffuse the incident second coherent light, thereby illuminating a second partial area in the predetermined range, and at least part of the second partial areas to be illuminated by the second element diffusion areas differ from each other; and the predetermined range illumination section may control the distribution of the illumination light in the predetermined range by controlling whether or not to allow the second coherent light from the coherent light source to enter the second element diffusion areas, or by controlling whether or not to allow the illumination light from the second element diffusion areas to enter the predetermined range.

In this case, the optical element may be a hologram recording medium; and the second element diffusion areas are element hologram areas having different interference patterns.

In this case, the first diffusion area may be composed of a plurality of first element diffusion areas which each diffuse the incident first coherent light, thereby illuminating a first partial area in the forward main range, and at least part of the first partial areas to be illuminated by the first element diffusion areas differ from each other; and the main illumination section may control the distribution of the forward main illumination light in the forward main range by controlling whether or not to allow the first coherent light from the coherent light source to enter the first element diffusion areas, or by controlling whether or not to allow the forward main illumination light from the first element diffusion areas to enter the forward main range.

Further, in this case, the illumination unit may further include a timing controller for individually controlling the timings of incidence of the first coherent light and the second coherent light on the optical element or the timings of illumination of the predetermined range and the forward main range. The illumination device may further comprise a scanning section for allowing the first coherent light and the second coherent light, emitted by the coherent light source, to scan the optical element. The scanning section may include a light scanning member for periodically changing the traveling directions of the first coherent light and the second coherent light, emitted by the coherent light source. The light scanning member may allow the first coherent light from the coherent light source to periodically scan the first diffusion area of the optical element and allow the second coherent light from the coherent light source to periodically scan the second diffusion area of the optical element; and the timing controller may control the timings of emission of the first coherent light and the second coherent light and thus the timings of incidence of the first coherent light and the second coherent light on the optical element in synchronization with the timings of scanning of the optical element with the first coherent light and the second coherent light by means of the light scanning member, thereby controlling whether or not to allow the first coherent light to enter the first element diffusion areas, and controlling whether or not to allow the second coherent light to enter the second element diffusion areas.

In the illumination device, the eye direction detection section may detect the direction of the eyes of the driver and/or the direction of the face of the driver based on an image of the face of the driver which has been shot directly. Alternatively, the eye direction detection section may detect the direction of the eyes of the driver and/or the direction of the face of the driver based on a shot image of the face of the driver reflected in a front window disposed in front of the driver.

Advantageous Effects of the Invention

The illumination device of the present invention can assist comfortable driving or steering and can improve the safety of driving or steering.

DETAILED DESCRIPTION OF THE INVENTION

Figure 1:
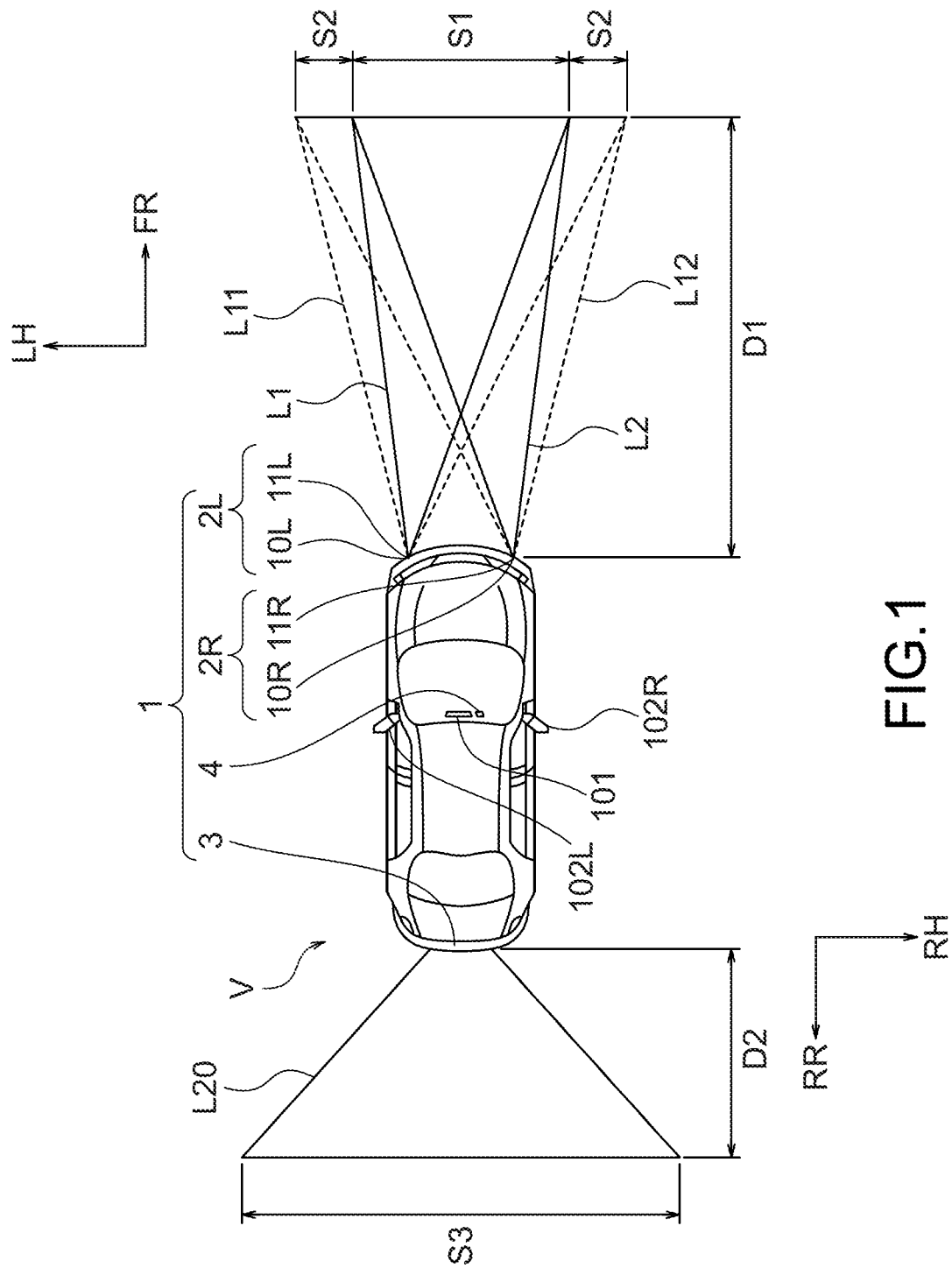
FIG. 1 is a diagram showing an automobile equipped with an illumination device according to an embodiment of the present invention.

Embodiments of the present invention will now be described with reference to the attached drawings. In the drawings attached hereto, scales, horizontal to vertical dimensional ratios, etc. are exaggeratingly modified from those of the real things for easier understanding of the drawings.

The terms used herein to specify shapes or geometric conditions, or the degree thereof, such as "parallel", "perpendicular", "same", etc., should not be bound to their strict sense, and should be construed to include equivalents or resemblances from which the same function or effect can be expected.

FIG. 1 is a diagram showing an automobile V equipped with a illumination device 1 according to an embodiment of the present invention. In FIG. 1, the symbol FR denotes forward of the automobile V, the symbol LH denotes leftward of the automobile V, the symbol RR denotes rearward of the automobile V, and the symbol RH denotes rightward of the automobile V.

In FIG. 1, the symbol 101 denotes a rearview mirror provided in the automobile V for a driver (operator) to view rearward of the automobile V, the symbol 102L denotes a left side mirror for the driver to view leftward or left rearward of the automobile V, and the symbol 102R denotes a right side mirror for the driver to view rightward or right rearward of the automobile V. The rearview mirror 101 is configured to reflect an image of an area, lying rearward of the automobile V, toward the driver. The left side mirror 102L is configured to reflect an image of an area, lying leftward or left rearward of the automobile V, toward the driver, while the right side mirror 102R is configured to reflect an image of an area, lying rightward or right rearward of the automobile V, toward the driver.

As shown in FIG. 1, the illumination device 1 of this embodiment includes front illumination units 2L, 2R provided on the left side and on the right side, respectively, of the front of the automobile V, a rear illumination unit 3 provided in the rear of the automobile V, and an eye direction detection section 4 for detecting the direction of the eyes of the driver and/or the direction of the face of the driver.

In the illustrated embodiment, the front illumination units 2L, 2R include main illumination sections 10L, 10R and predetermined forward range illumination sections 11L, 11R each integrated with the corresponding main illumination section. In the front illumination unit 2L, the main illumination section 10L can illuminate a forward main range S1 by emitting forward main illumination light L1 shown by the solid lines, while the predetermined forward range illumination section 11L can illuminate a predetermined forward range S2, which is set outside the forward main range S1, by emitting forward sub illumination light L11 shown by the broken lines. In the front illumination unit 2R, the main illumination section 10R can illuminate the forward main range S1 by emitting forward main illumination light L2 shown by the solid lines, while the predetermined forward range illumination section 11R can illuminate the predetermined forward range S2, which is set outside the forward main range S1, by emitting forward sub illumination light L12 shown by the broken lines.

In the illustrated embodiment, the left and right main illumination sections 10L, 10R can illuminate the same forward main range S1 lying at a position forward of the automobile V and at a predetermined distance D1 from the automobile V. The forward main range S1 is set at a range that meets a predetermined light distribution standard for vehicular headlights. The headlights of road motor vehicles must meet a national regulation or standard. Thus, the predetermined light distribution standard herein refers to such a national regulation or standard. Specific examples of Japanese standards may include JIS D5500, "Uniform provisions concerning the approval of adaptive front-lighting systems (AFS) for motor vehicles", etc. Specific examples of headlight light distribution standards of countries other than Japan, which are equivalent to such Japanese standards, include the European ECE (Economic commission for Europe) Standard, the U.S. SAE (Society of Automotive Engineers) Standard, etc. On the other hand, the left and right predetermined forward range illumination sections 11L, 11R can illuminate the same predetermined forward range S2 lying at a position forward of the automobile V and at a predetermined distance D1 from the automobile V. The predetermined forward range S2 is set at a range that does not meet the above-described light distribution standard.

Though in the illustrated embodiment the left and right main illumination sections 10L, 10R illuminate the same forward main range S1, it is also possible to allow the main illumination sections 10L, 10R to illuminate different ranges. Similarly, it is also possible to allow the left and right predetermined forward range illumination sections 11L, 11R to illuminate different ranges. Though in this embodiment the forward main range S1 meets a predetermined light distribution standard for vehicular headlights, the forward main range S1 need not necessarily meet such a light distribution standard.

In the illustrated embodiment, the rear illumination unit 3 can illuminate a predetermined rearward range S3, lying at a position rearward of the automobile V and at a predetermined distance D2 from the automobile V, by emitting rearward illumination light L20. The rear illumination unit 3 is an apparatus installed separately from a brake lamp, etc. of the automobile V.

Figure 2:
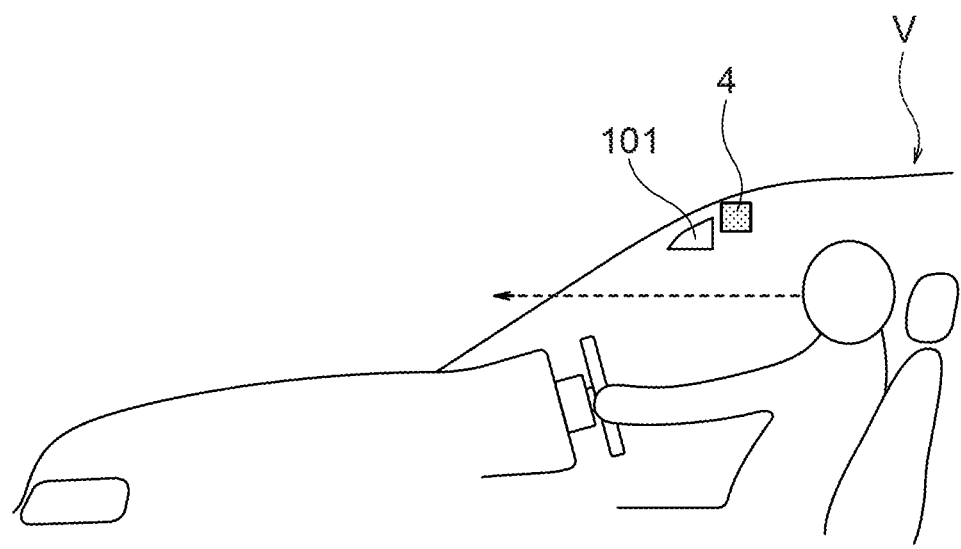
FIG. 2 is a diagram illustrating the installation position of an eye direction detection section in the illumination device of FIG. 1.

The eye direction detection section 4 is configured to detect the direction of the eyes of the driver and/or the direction of the face of the driver e.g. based on a shot image of the face of the driver. FIG. 2 is a diagram illustrating the installation position of the eye direction detection section 4. As shown in FIG. 2, in this embodiment the eye direction detection section 4 is disposed in the automobile V at a position which is located in the vicinity of the rearview mirror 101 and in which the head of the driver can be observed from before and above when the driver is seated. In this embodiment the eye direction detection section 4 detects the direction of the eyes of the driver and/or the direction of the face of the driver based on an image of the face of the driver which has been shot directly.

In particular, the eye direction detection section 4 of this embodiment is configured to be capable of detecting whether or not the driver faces, for example, an area right forward or left forward of the automobile V or an area forward and above the automobile V, and whether or not the driver is viewing the rearview mirror 101 or the side mirror 102L or 102R. Since in this embodiment the eye direction detection section 4 detects the direction of the eyes of the driver and/or the direction of the face of the driver based on an image of the face which has been shot directly, the direction of the eyes of the driver and/or the direction of the face of the driver can be detected with good accuracy.

According to the illumination device 1 of this embodiment, in the front illumination units 2L, 2R, the left and right main illumination sections 10L, 10R continually illuminate forward of the automobile V especially during the night, while the predetermined forward range illumination sections 11L, 11R control the distributions of the forward sub illumination lights L11, L12 based on the direction of the eyes of the driver and/or the direction of the face of the driver, detected by the eye direction detection section 4. Similarly, the rear illumination unit 3 controls the distribution of the rearward illumination light L20 based on the direction of the eyes of the driver and/or the direction of the face of the driver, detected by the eye direction detection section 4. The front illumination units 2L, 2R and the rear illumination unit 3 will now be described in detail.

(Front Illumination Units)

Figure 3:
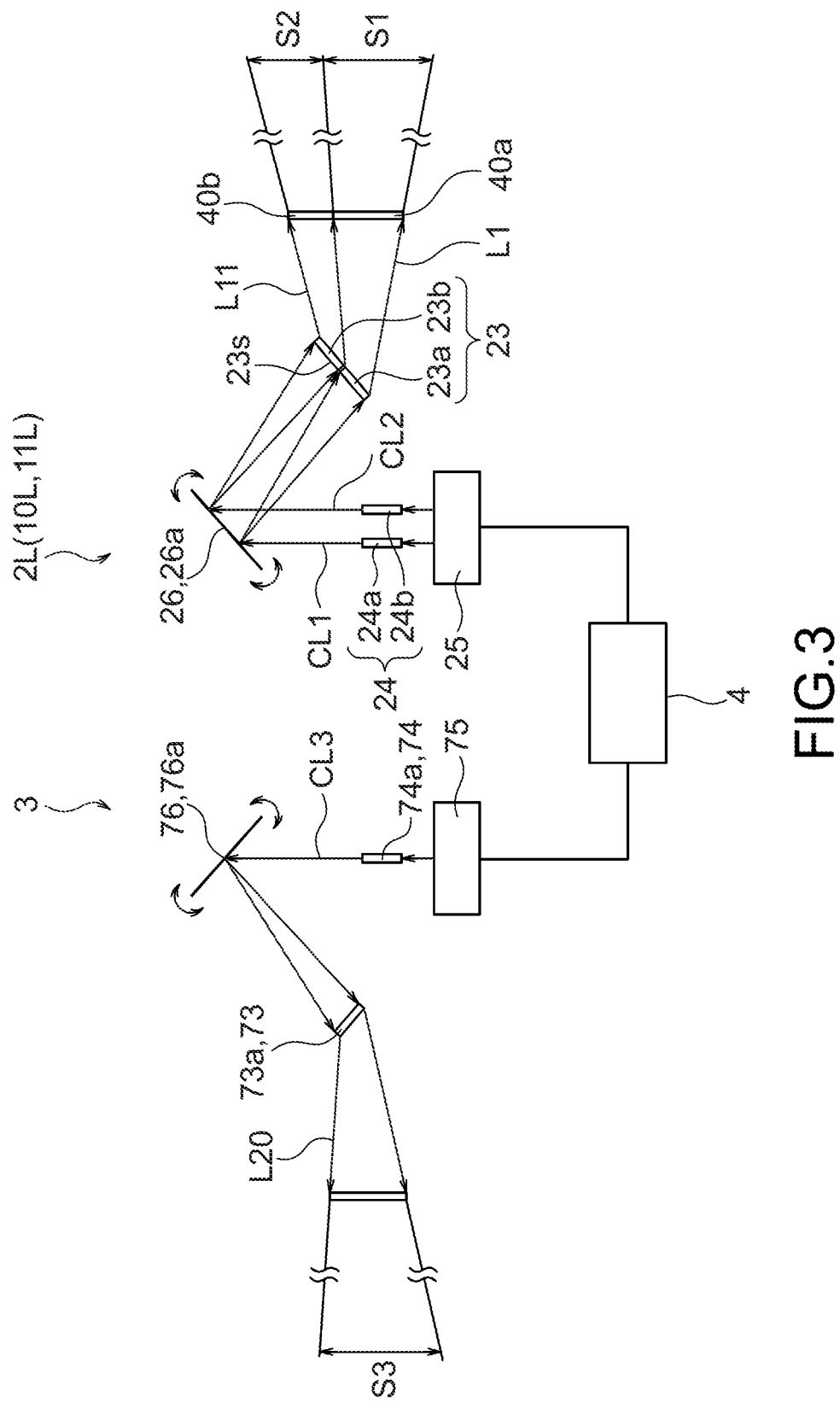
FIG. 3 is a diagram showing a schematic construction of the illumination device of FIG. 1.

FIG. 3 is a diagram showing a schematic construction of the illumination device 1. In FIG. 3, the front illumination unit 2L, the rear illumination unit 3 and the eye direction detection section 4 are shown, whereas the depiction of the front illumination unit 2R has been omitted. The front illumination unit 2L and the front illumination unit 2R have the same construction; therefore, only the front illumination unit 2L will be described hereinbelow and a description of the front illumination unit 2R will be omitted.

As shown in FIG. 3, the front illumination unit 2L of this embodiment includes: a coherent light source 24 including a first light source section 24a for emitting first coherent light CL1, and a second light source section 24b for emitting second coherent light CL2; a timing controller 25 for individually controlling the timing of emission of the first coherent light CL1 and the timing of emission of the second coherent light CL2, or the timing of incidence of each light on the below-described optical element 23; an optical element 23 having a first diffusion area 23a which the first coherent light CL1, for which the emission timing or the incidence timing is controlled by the timing controller 25, enters and a second diffusion area 23b which the second coherent light CL2, for which the emission timing or the incidence timing is controlled by the timing controller 25, enters; and a scanning section 26 for allowing the first coherent light CL1 from the coherent light source 24 to scan the first diffusion area 23a, and allowing the second coherent light CL2 from the coherent light source 24 to scan the second diffusion area 23b.

In the optical element 23, the first diffusion area 23a is configured to diffuse the first coherent light CL1 and emit the forward main illumination light L1, thereby illuminating the forward main range S1. On the other hand, the second diffusion area 23b is configured to diffuse the second coherent light CL2 and emit the forward sub illumination light L11, thereby illuminating the predetermined forward range S2. Thus, in this embodiment, the above-described main illumination section 10L is composed mainly of the first light source section 24a, the timing controller 25, the first diffusion area 23a of the optical element 23, and the scanning section 26, while the above-described predetermined forward range illumination section 11L is composed mainly of the second light source section 24b, the timing controller 25, the second diffusion area 23b of the optical element 23, and the scanning section 26.

A semiconductor laser light source, for example, can be used as the first light source section 24a and the second light source section 24b in the coherent light source 24. The first light source section 24a and the second light source section 24b may be provided independently on separate substrates. Alternatively, it is possible to use a light source module in which the first light source section 24a and the second light source section 24b are disposed side by side on a common substrate. It is also possible to use a plurality of first light source sections 24a and a plurality of second light source sections 24b in order to increase the emission intensity. The emission wavelength range of the first coherent light CL1 may be the same as or different from the emission wavelength range of the second coherent light CL2.

The timing controller 25 may control the timing of emission of coherent light from the first light source section 24a and the second light source section 24b, or control the timing of incidence of coherent light on the optical element 23. Alternatively, the timing controller 25 may control the timing of illumination of the illumination ranges, i.e. the forward main range S1 and the predetermined forward range S2, with coherent light that has been diffused by the optical element 23. The following description mainly illustrates a case where the timing controller 25 controls the timing of emission of coherent light from the first light source section 24a and the second light source section 24b. In this case, the timing of incidence of light on the optical element 23 is also to be controlled by controlling the timing of emission of light from the first light source section 24a and the second light source section 24b by means of the timing controller 25.

In particular, for example, the timing controller 25 controls whether or not to emit the coherent lights CL1, CL2 from the light source sections 24a, 24b, i.e. controls on/off of the emission of the respective light. Alternatively, the timing controller 25 may control whether or not to guide the coherent lights CL1, CL2, emitted from the light source sections 24a, 24b, to the light entrance surface of the scanning section 26. In the latter case, a not-shown light shutter section may be provided between the light source sections 24a, 24b and the scanning section 26. The light shutter section switches passage/shut-off of the coherent lights CL1, CL2. In this embodiment, the timing controller 25 is connected to the eye direction detection section 4 so that the timing of emission of light can be controlled in response to detection by the eye direction detection section 4.

The scanning section 26 allows the coherent lights, emitted by the light source sections 24a, 24b, to scan the optical element 23. The scanning section 26 may move the light source sections 24a, 24b so that the respective laser lights scan the optical element 23, or move the optical element 23 so that the respective coherent lights scan the optical element 23. Alternatively, the scanning section 26 may be provided with a light scanning member 26a for changing the traveling directions of the coherent lights from the light source sections 24a, 24b so that the coherent lights will scan the optical element 23. The following description mainly illustrates the case where the scanning section 26 has the light scanning member 26a. The timing controller 25 individually controls the timings of emission of the coherent lights, the timings of incidence of the coherent lights on the optical element 23, or the timings of illumination of the illumination ranges in synchronization with the timings of scanning of the optical element 23 with the coherent lights by means of the light scanning member 26a so that the manner of illumination of the illumination ranges will change periodically or temporarily.

The light scanning member 26a changes over time the traveling directions of the first coherent light CL1 and the second coherent light CL2 from the coherent light source 24 so as not to make the traveling directions of the first coherent light CL1 and the second coherent light CL2 constant. This allows the first coherent light CL1 and the second coherent light CL2 which have exited the light scanning member 26a to scan the light entrance surface 23s of the optical element 23.

Figure 4:
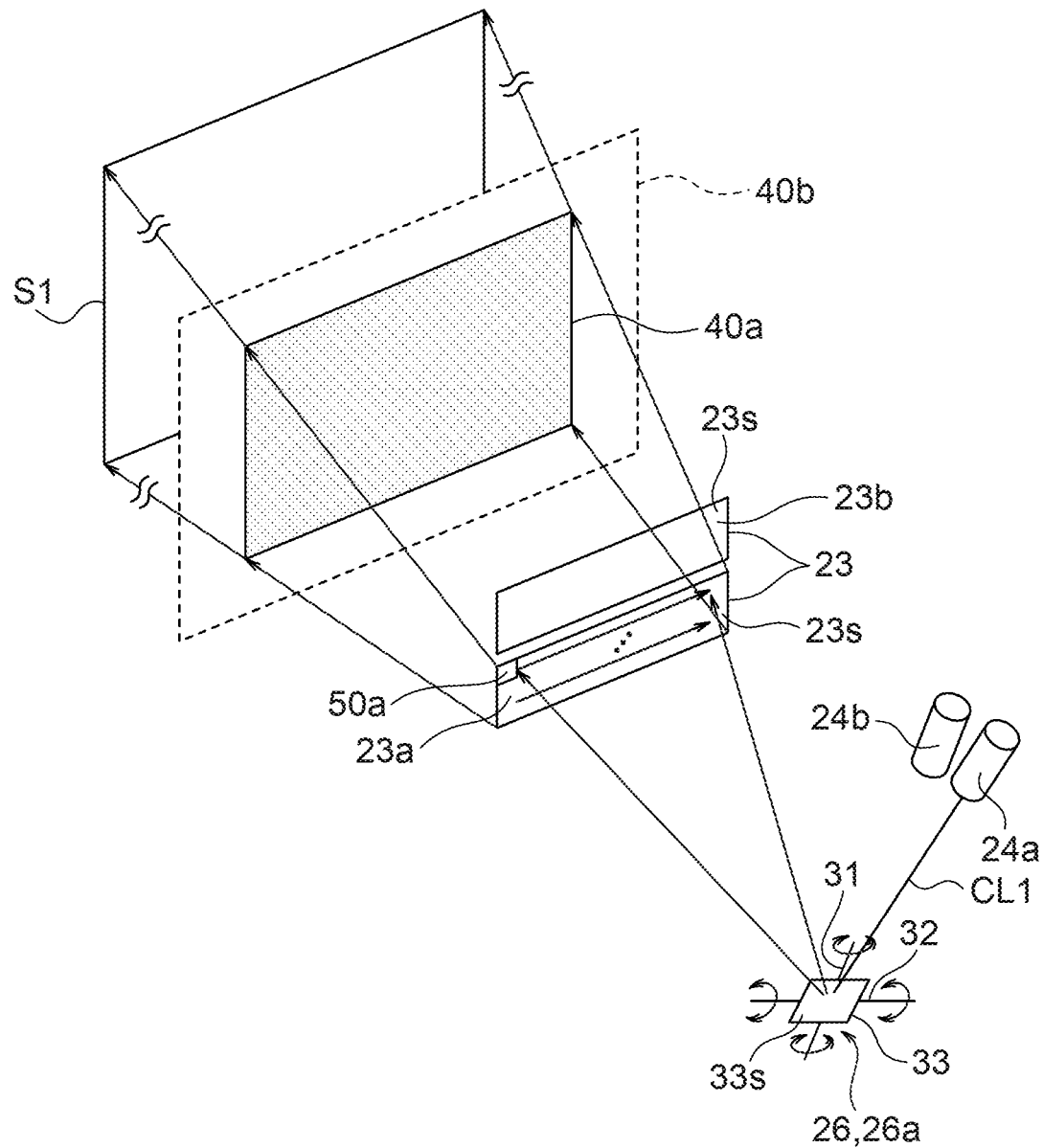
FIG. 4 is a diagram illustrating how first coherent light is allowed to scan an optical element by a scanning section (light scanning member) in a front illumination unit of the illumination device of FIG. 1.
Figure 5:
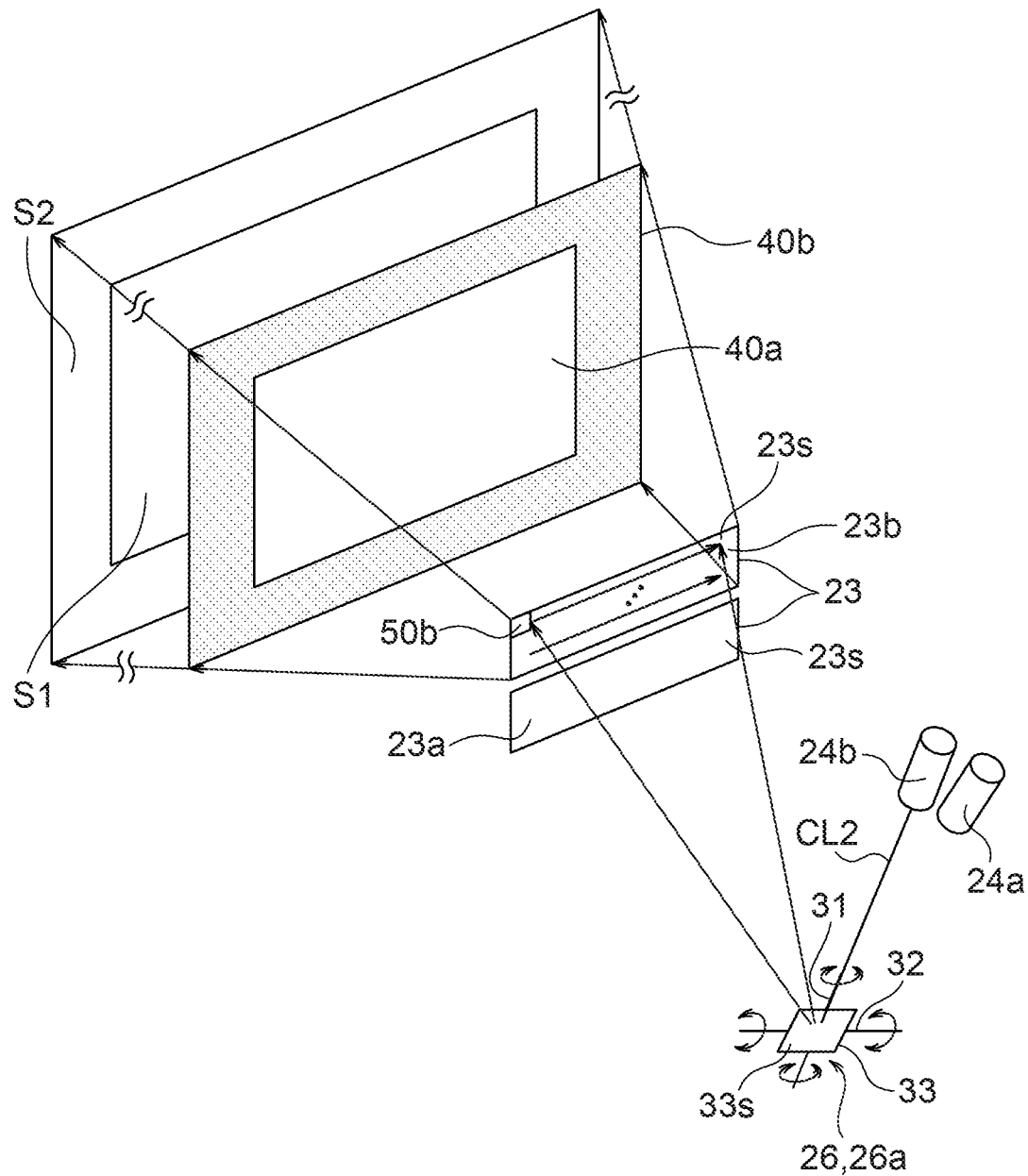
FIG. 5 is a diagram illustrating how second coherent light is allowed to scan the optical element by the scanning section (light scanning member) in the front illumination unit of the illumination device of FIG. 1.

In an example, as shown in FIGS. 4 and 5, the light scanning member 26a comprises a reflecting device 33 which is rotatable on two rotational axes 31, 32 that are parallel to intersecting directions. The coherent lights CL1, CL2 from the coherent light source 24 which have entered the reflecting surface 33s of the reflecting device 33 are reflected at an angle which varies according to the inclination angle of the reflecting surface 33s, and travel in a direction toward the light entrance surface 23s of the optical element 23. The coherent lights CL1, CL2 two-dimensionally scan the light entrance surface 23s of the optical element 23 by rotating the reflecting device 33 on the two rotational axes 31, 32. For example, the reflecting device 33 repeats the operation of rotating on the two rotational axes 31, 32 with a constant cycle time. Accordingly, the coherent lights CL1, CL2 two-dimensionally scan the light entrance surface 23s of the optical element 23 repeatedly in synchronization with the cycle time.

The use of only one light scanning member 26a is envisaged in this embodiment: the first coherent light CL1 and the second coherent light CL2, emitted by the coherent light source 24, both enter the common light scanning member 26a. The traveling direction of the respective coherent light is changed over time by the light scanning member 26a, whereby the coherent lights scan the optical element 23. However, the present invention is not limited to this feature. Thus, it is possible to provide a light scanning member exclusively for the first coherent light CL1 and a light scanning member exclusively for the second coherent light CL2.

As described above, the optical element 23 has the first diffusion area 23a which the first coherent light CL1 enters, and the second diffusion area 23b which the second coherent light CL2 enters. The first diffusion area 23a is configured to diffuse the first coherent light CL1 and emit the forward main illumination light L1, thereby illuminating the forward main range S1. On the other hand, the second diffusion area 23b is configured to diffuse the second coherent light CL2 and emit the forward sub illumination light L11, thereby illuminating the predetermined forward range S2.

In particular, as shown in FIGS. 3 through 5, in this embodiment the forward main illumination light L1 passes through a first illumination area 40a, and then illuminates the forward main range S1 which is the actual illumination range. On the other hand, the forward sub illumination light L11 passes through a second illumination area 40b, and then illuminates the predetermined forward range S2 which is the actual illumination range.

The illumination areas 40a, 40b are so-called near-field illumination areas which are illuminated by the diffusion areas 23a, 23b of the optical element 23. The far-field illumination ranges (the forward main range S1, the predetermined forward range S2) are each more often expressed in terms of a diffusion angle distribution in the angular space (the near-field illumination area) rather than in term of the dimensions of the actual illumination area. The term "illumination area" herein encompasses, in addition to the actual illumination area (illumination range), a diffusion angle range in an angular space. In this embodiment, a diffusion angle range for illuminating the forward main range S1 is expressed (set) in the first illumination area 40a, and a diffusion angle range for illuminating the predetermined forward range S2 is expressed (set) in the second illumination area 40b.

As shown in FIGS. 4 and 5, in this embodiment the first diffusion area 23a and the second diffusion area 23b each have an elongated shape extending in a uniaxial direction (e.g. lateral direction), and are disposed side by side in a direction (e.g. vertical direction) perpendicular to the uniaxial direction.

In the envisaged normal manner of using the illumination device 1 according to this embodiment, the first diffusion area 23a for illuminating the area that meets a headlight light distribution standard is lit over substantially the entire area, whereas the second diffusion area 23b for illuminating the area that does not meet the headlight light distribution standard is unlit over substantially the entire area. If the elongated first diffusion area 23a and the elongated second diffusion area 23b are disposed side by side in the uniaxial direction, then the areas have a more elongated overall shape as a whole which makes it difficult to secure their installation space in the front face of a vehicle. In addition, one half of the elongated shape is lit and the other half is unlit during normal use of the illumination device 1, which will impair the design aesthetics.

The installation space problem and the design aesthetics problem both can be solved by disposing the elongated first diffusion area 23a and the elongated second diffusion area 23b side by side in a direction perpendicular to the uniaxial direction as in this embodiment.

Figure 6:
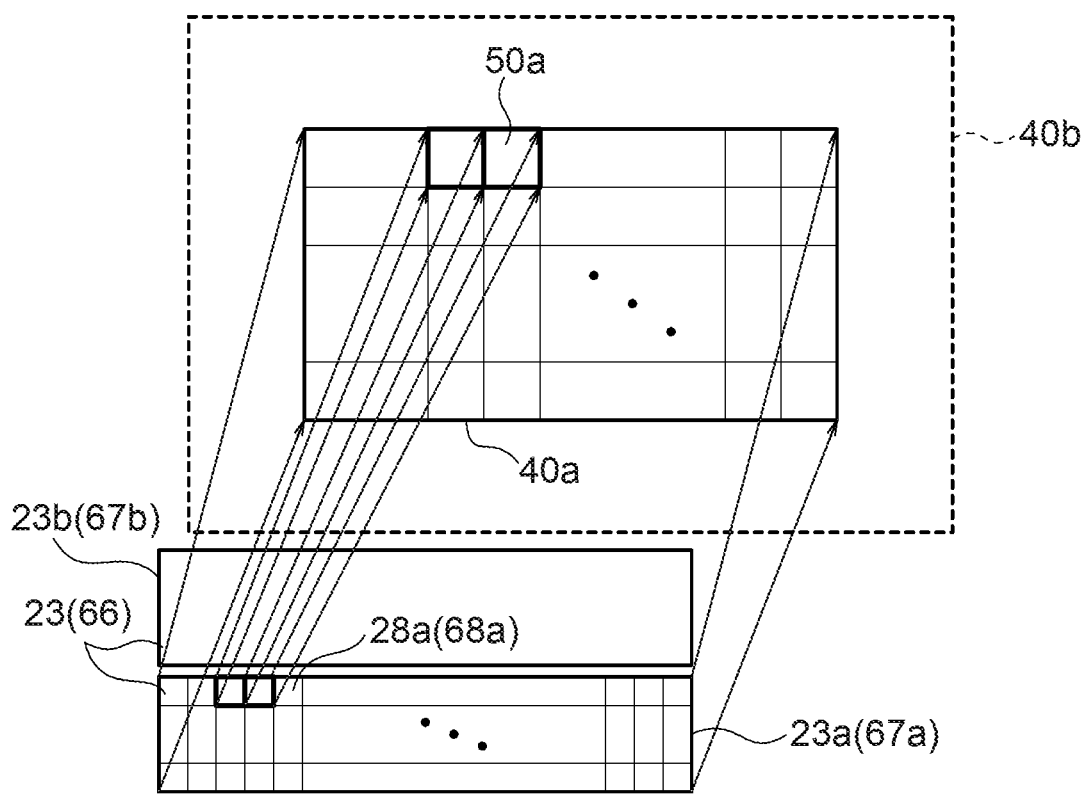
FIG. 6 is a diagram illustrating how the first coherent light, which has been diffused by the optical element in the front illumination unit, enters a first illumination area.
Figure 7:
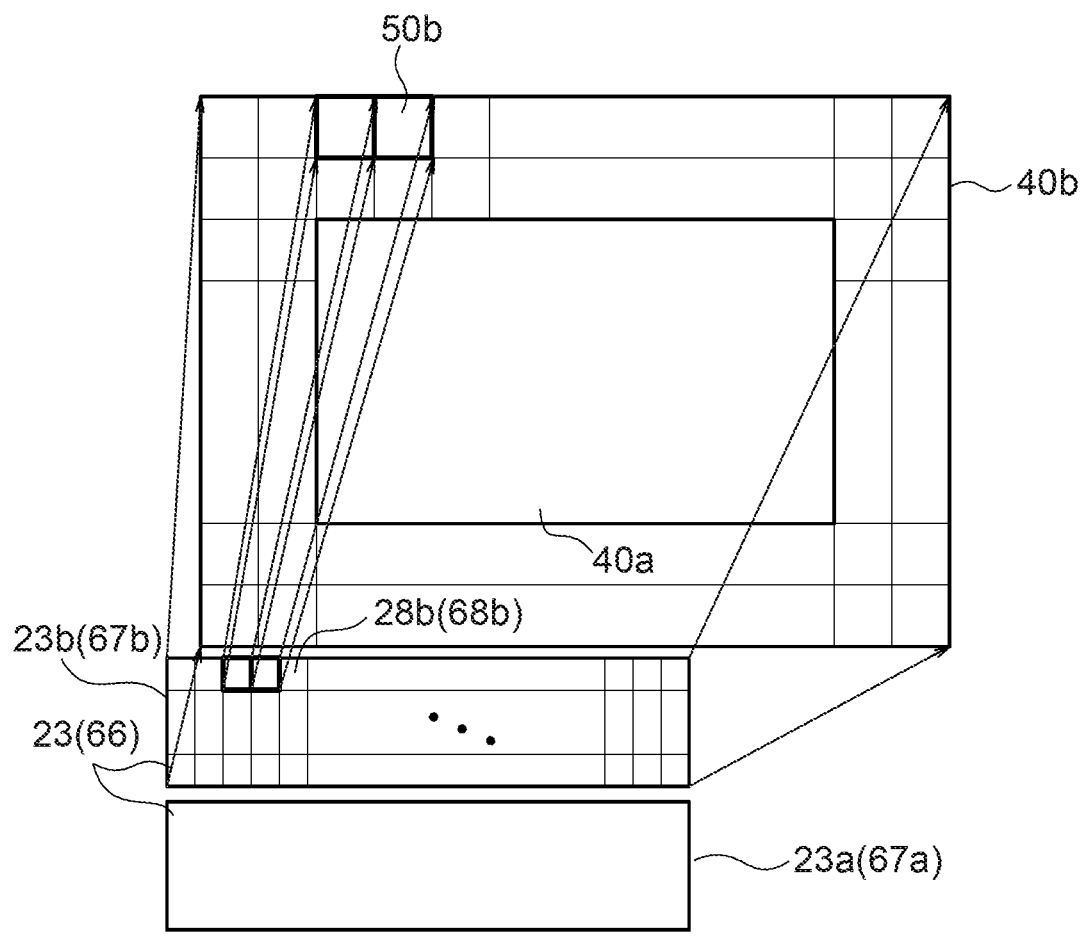
FIG. 7 is a diagram illustrating how the second coherent light, which has been diffused by the optical element in the front illumination unit, enters a second illumination area.

FIG. 6 is a diagram illustrating how the first coherent light CL1, which has been diffused by the first diffusion area 23a of the optical element 23, enters the first illumination area 40a, and FIG. 7 is a diagram illustrating how the second coherent light CL2, which has been diffused by the second diffusion area 23b of the optical element 23, enters the second illumination area 40b. As shown in FIGS. 6 and 7, the coherent lights CL1, CL2 enter the diffusion areas 23a, 23b, respectively. The first diffusion area 23a diffuses the incident first coherent light CL1 and, as a whole, illuminates the entire illumination area 40a. On the other hand, the second diffusion area 23b diffuses the incident second coherent light CL2 and, as a whole, illuminates the entire illumination area 40b.

As shown in FIG. 6, the first diffusion area 23a is composed of a plurality of first element diffusion areas 28a. Each first element diffusion area 28a diffuses the incident first coherent light CL1 and illuminates a corresponding first partial area 50a in the first illumination area 40a. At least part of the first partial areas 50a differ for each first element diffusion area 28a. As shown in FIG. 7, the second diffusion area 23b is composed of a plurality of second element diffusion areas 28b. Each second element diffusion area 28b diffuses the incident second coherent light CL2 and illuminates a corresponding second partial area 50b in the second illumination area 40b. At least part of the second partial areas 50b differ for each second element diffusion area 28b.

Such optical element 23 can be comprised of, for example, a hologram recording medium 66. As shown, for example, in FIGS. 6 and 7, the hologram recording medium 66 has a first hologram area 67a and a second hologram area 67b. The first hologram area 67a is provided for the first coherent light CL1. The second hologram area 67b is provided for the second coherent light CL2. The first coherent light CL1 which has entered the first hologram area 67a and has been diffused by it illuminates the first illumination area 40a. The second coherent light CL2 which has entered the second hologram area 67b and has been diffused by it illuminates the second illumination area 40b.

As shown in FIG. 6, the first hologram area 67a is composed of a plurality of first element hologram areas 68a. Each first element hologram area 68a diffuses the incident first coherent light CL1, thereby illuminating a corresponding first partial area 50a in the first illumination area 40a. At least part of the first partial areas 50a that the first element hologram areas 68a illuminate differ for each first element hologram area 68a. Thus, the first partial areas 50a that the first element hologram areas 68a illuminate at least partly differ from each other.

As shown in FIG. 7, the second hologram area 67b is composed of a plurality of second element hologram areas 68b. Each second element hologram area 68b diffuses the incident second coherent light CL2, thereby illuminating a corresponding second partial area 50b in the second illumination area 40b. At least part of the second partial areas 50b that the second element hologram areas 68b illuminate differ for each second element hologram area 68b. Thus, the second partial areas 50b that the second element hologram areas 68b illuminate at least partly differ from each other.

The element hologram areas 68a, 68b each have an interference pattern. The coherent light CL1, CL2 that has entered each element hologram area 68a, 68b is diffracted by the corresponding interference pattern, and then illuminates the corresponding partial area 50a, 50b in the illumination area 40a, 40b. The traveling direction of the coherent light CL1, CL2 diffracted, or diffused by each element hologram area 68a, 68b can be changed by adjusting the interference patterns in various ways.

The coherent light CL1, CL2 that has entered various points in each element hologram area 68a, 68b thus illuminates the corresponding partial area 50a, 50b in the illumination area 40a, 40b. The light scanning member 26a changes over time the incident position and the incident angle of the coherent light CL1, CL2 entering each element hologram area 68a, 68b by allowing the coherent light CL1, CL2 to scan the element hologram area 68a, 68b. No matter what positions in an element hologram area 68a, 68b the coherent light CL1, CL2 enters, the light illuminates a common partial area 50a, 50b. This means that the incident angle of the coherent light CL1, CL2, which enters various positions in a partial area 50a, 50b over time, changes over time. The change in the incident angle is so fast that it cannot be resolved by human eyes and, accordingly, multiplexed uncorrelated scattering patterns of the coherent light CL1, CL2 are perceived by human eyes. Thus, speckles which are produced for the scattering patterns are superimposed and averaged, and the averaged speckles are observed by a viewer. Therefore, speckles are obscure in the illumination areas 40a, 40b. Further, since the coherent light CL1, CL2 from the light scanning member 26a scan the element hologram areas 68a, 68b of the hologram area 67a, 67b in order, the coherent light CL1, CL2 that has been diffracted at various points in the element hologram areas 68a, 68b has different wavefronts. The diffracted coherent lights CL1, CL2 are independently superimposed on the illumination area 40a, 40b; therefore, a uniform illuminance distribution with obscure speckles can be obtained on the illumination area 40a, 40b.

Though FIG. 6 illustrates a case where the different first element hologram areas 68a illuminate the different first partial areas 50a in the first illumination area 40a, part of the first partial areas 50a may overlap with adjacent first partial areas 50a. Further, the size of each first partial area 50a may differ for each first element hologram area 68a. The first partial areas 50a need not necessarily be arranged in the first illumination area 40a in accordance with the order of the arrangement of the corresponding first element hologram areas 68a. Thus, the order of the arrangement of the first element hologram areas 68a in the first hologram area 67a need not necessarily coincide with the order of the arrangement of the corresponding first partial areas 50a in the first illumination area 40a. The same holds true for the second element hologram areas 68b and the corresponding second partial areas 50b.

In the front illumination unit 2L of this embodiment having the above construction, the light scanning member 26a allows the first coherent light CL1 and the second coherent light CL2 from the coherent light source 24 to periodically scan the first diffusion area 23a and the second diffusion area 23b, respectively, of the optical element 23, and the timing controller 25 individually controls the timing of emission of the first coherent light CL1 and the timing of emission of the second coherent light CL2 in synchronization with the timings of scanning of the optical element 23 with the first coherent light CL1 and the second coherent light CL2 by means of the light scanning member 26a.

Figure 8:
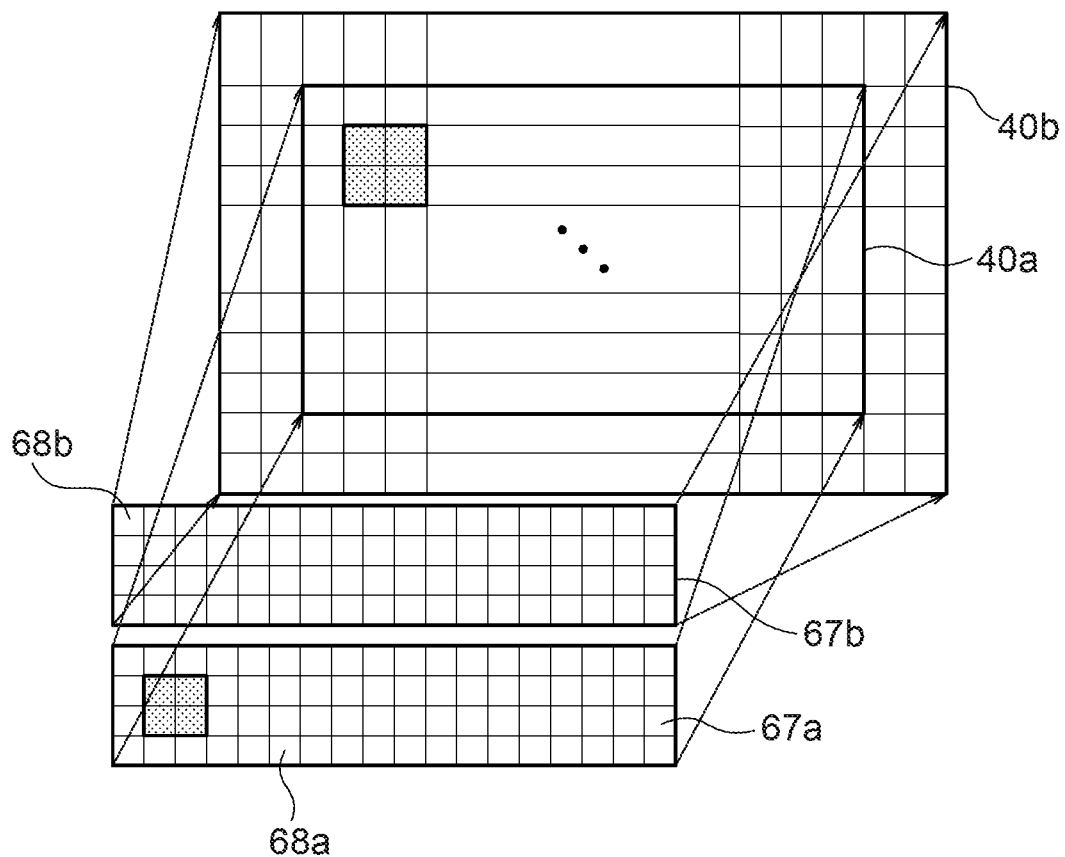
FIG. 8 is a diagram illustrating a case where any arbitrary area in the first illumination area is illuminated by controlling the timing of emission of the first coherent light.

By thus controlling with the timing controller 25 whether or not to allow the first coherent light CL1 to enter the first element hologram areas 68a, any arbitrary area in the first illumination area 40a, as shown by the dotted area of FIG. 8, can be selectively illuminated. Accordingly, any arbitrary area in the forward main range S1 can be selectively illuminated. The selected first partial areas 50a are illuminated or scanned in order by the first coherent light CL1 at such a high speed that the sequential illumination is perceived as simultaneous illumination by human eyes.

Figure 9:
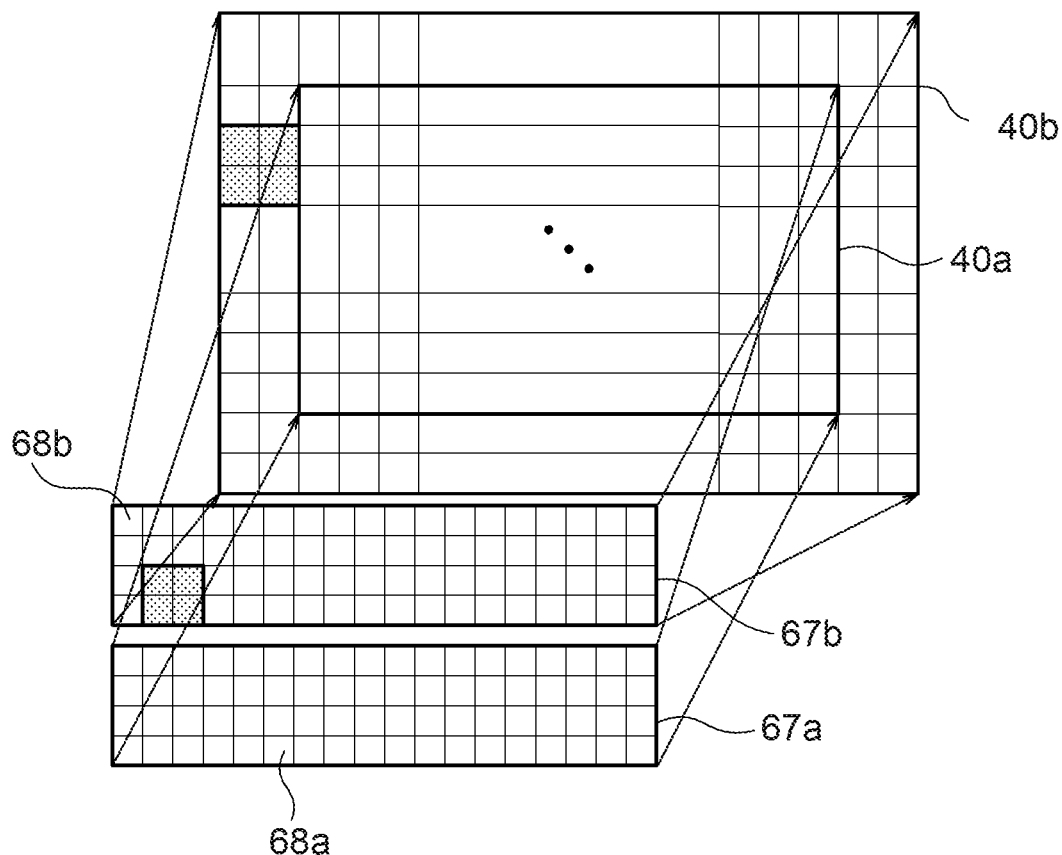
FIG. 9 is a diagram illustrating a case where any arbitrary area in the second illumination area is illuminated by controlling the timing of emission of the second coherent light.

By thus controlling with the timing controller 25 whether or not to allow the second coherent light CL2 to enter the second element hologram areas 68b, any arbitrary area in the second illumination area 40b, as shown by the dotted area of FIG. 9, can be selectively illuminated. Accordingly, any arbitrary area in the predetermined forward range S2 can be selectively illuminated. The selected second partial areas 50b are illuminated or scanned in order by the second coherent light CL2 at such a high speed that the sequential illumination is perceived as simultaneous illumination by human eyes.

Among other things, according to the predetermined forward range illumination section 11L, the distribution of the forward sub illumination light L11 can be controlled by controlling with the timing controller 25 whether or not to allow the second coherent light CL2 to enter the second element hologram areas 68b based on the direction of the eyes of a driver and/or the direction of the face of the driver, detected by the eye direction detection section 4. In particular, the predetermined forward range illumination section 11L of this embodiment is configured to control the distribution of the forward sub illumination light L11 so that it will illuminate an area, lying in the direction of the eyes of the driver and/or the direction of the face of the driver, in the predetermined forward range S2. For example, when the driver faces left forward, a left forward area existing in the direction of the driver's eyes can be illuminated. When the driver faces upward and forward, an upward and forward area existing in the direction of the driver's eyes can be illuminated.

(Rear Illumination Unit)

The rear illumination unit 3 of this embodiment will now be described in detail with reference to FIG. 3 and FIGS. 10 through 12.

As shown in FIG. 3, the rear illumination unit 3 of this embodiment includes: a coherent light source 74 including a third light source section 74a for emitting third coherent light CL3; a timing controller 75 for controlling the timing of emission of the third coherent light CL3 or the timing of incidence of the third coherent light CL3 on the below-described optical element 73; an optical element 73 having a diffusion area 73a which the third coherent light CL3, for which the emission timing or the incidence timing is controlled by the timing controller 75, enters; and a scanning section 76 for allowing the third coherent light CL3 from the coherent light source 74 to scan the diffusion area 73a. In the rear illumination unit 3, the diffusion area 73a of the optical element 73 is configured to diffuse the third coherent light CL3 and emit the rearward illumination light L20, thereby illuminating the predetermined rearward range S3.

The light source section 74a of the coherent light source 74 may be, for example, a semiconductor laser light source. The timing controller 75 may control the timing of emission of the third coherent light CL3 from the third light source section 74a, or control the timing of incidence of coherent light on the optical element 73. Alternatively, the timing controller 75 may control the timing of illumination of the illumination range, i.e. the predetermined rearward range S3, with coherent light that has been diffused by the optical element 73. The following description mainly illustrates a case where the timing controller 75 controls the timing of emission of coherent light from the light source section 74a. In this case, the timing of incidence of light on the optical element 73 is also to be controlled by controlling the timing of emission of light from the light source section 74a by means of the timing controller 75. In particular, for example, the timing controller 75 controls whether or not to emit the third coherent light CL3 from the third light source section 74a, i.e. controls on/off of the emission of the light. Alternatively, the timing controller 75 may control whether or not to guide the third coherent light CL3, emitted from the third light source section 74a, to the light entrance surface of the scanning section 76. In the latter case, a not-shown light shutter section may be provided between the third light source section 74a and the scanning section 76. The light shutter section switches passage/shut-off of the third coherent light CL3. In this embodiment, the timing controller 75 is connected to the eye direction detection section 4 so that the timing of emission of light can be controlled in response to detection by the eye direction detection section 4.

The scanning section 76 allows the coherent light, emitted by the light source section 74a, to scan the optical element 73. The scanning section 76 may move the light source section 74a so that the coherent light scans the optical element 73, or move the optical element 73 so that the coherent light scans the optical element 73. Alternatively, the scanning section 76 may be provided with a light scanning member 76a for changing the traveling direction of the laser light from the light source section 74a so that the coherent light will scan the optical element 73. The following description mainly illustrates the case where the scanning section 76 has the light scanning member 76a. The timing controller 75 controls the timing of emission of the coherent light, the timing of incidence of the coherent light on the optical element 73, or the timing of illumination of the illumination range in synchronization with the timing of scanning of the optical element 73 with the coherent light by means of the light scanning member 76a so that the manner of illumination of the illumination range will change periodically or temporarily.

The light scanning member 76a changes over time the traveling direction of the third coherent light CL3 from the coherent light source 74 so as not to make the traveling direction of the third coherent light CL3 constant. This allows the third coherent light CL3 which has exited the light scanning member 76a to scan the light entrance surface 73s of the optical element 73.

Figure 10:
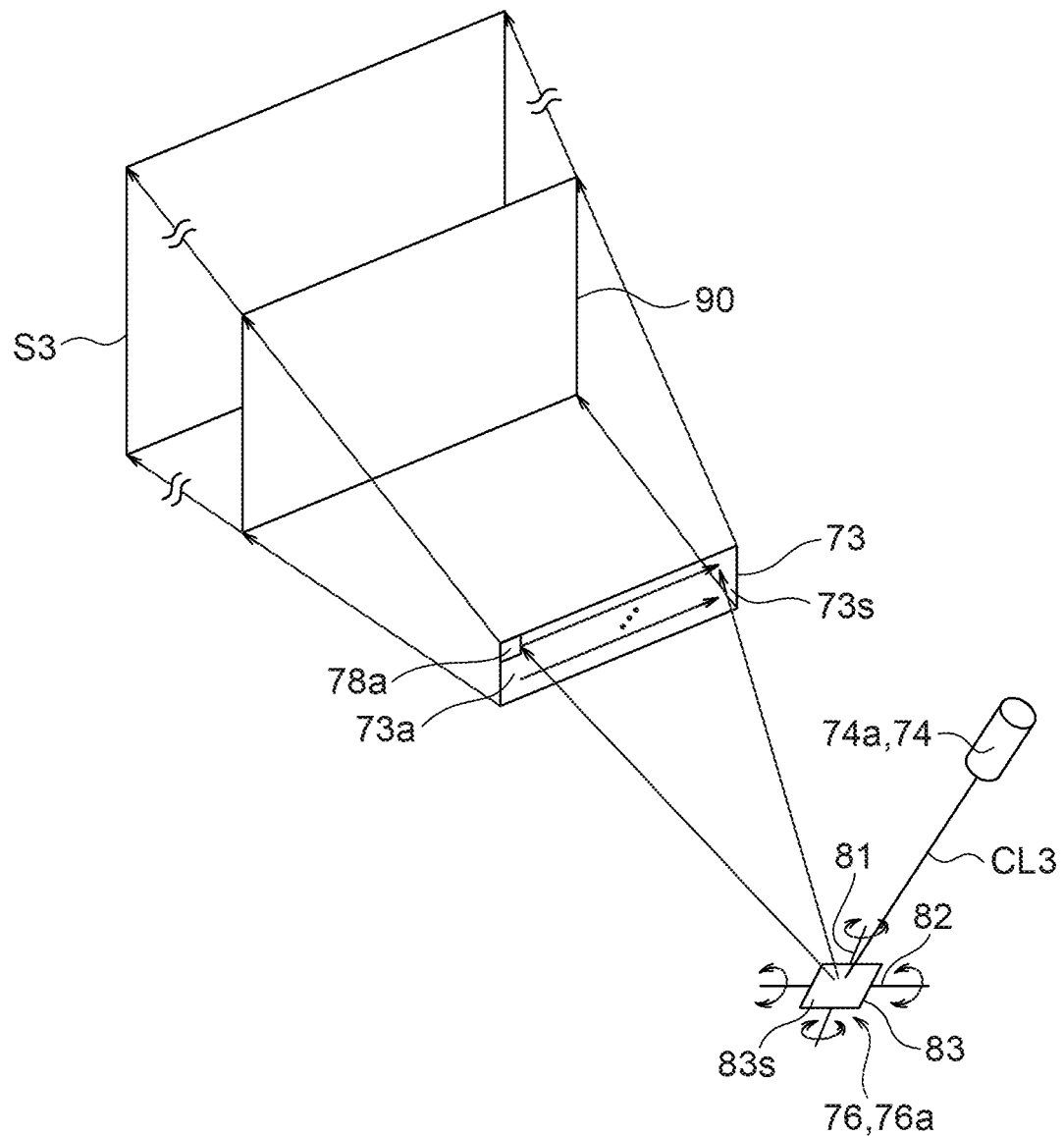
FIG. 10 is a diagram illustrating how third coherent light is allowed to scan an optical element by a scanning section (light scanning member) in a rear illumination unit of the illumination device of FIG. 1.

In an example, as shown in FIG. 10, the light scanning member 76a comprises a reflecting device 83 which is rotatable on two rotational axes 81, 82 that are parallel to intersecting directions. The third coherent light CL3 which has entered the reflecting surface 83s of the reflecting device 83 is reflected at an angle which varies according to the inclination angle of the reflecting surface 83s, and travels in a direction toward the light entrance surface 73s of the optical element 73. The third coherent light CL3 two-dimensionally scans the light entrance surface 73s of the optical element 73 by rotating the reflecting device 83 on the two rotational axes 81, 82. For example, the reflecting device 83 repeats the operation of rotating on the two rotational axes 81, 82 with a constant cycle time. Accordingly, the third coherent light CL3 two-dimensionally scans the light entrance surface 73s of the optical element 73 repeatedly in synchronization with the cycle time.

As described above, the optical element 73 has the diffusion area 73a which the third coherent light CL3 enters. The diffusion area 73a is configured to diffuse the third coherent light CL3 and emit the rearward illumination light L20, thereby illuminating the predetermined rearward range S3. In particular, as shown in FIGS. 3 and 10, in this embodiment the rearward illumination light L20, which has been diffused from the third coherent light CL3 and emitted by the diffusion area 73a, passes through an illumination area 90, and then illuminates the predetermined rearward range S3 which is the actual illumination range.

The illumination area 90 is a so-called near-field illumination area which is illuminated by the diffusion area 73a of the optical element 73. Therefore, in this embodiment, a diffusion angle range for illuminating the predetermined rearward range S3 is expressed (set) in the illumination area 90.

Figure 11:
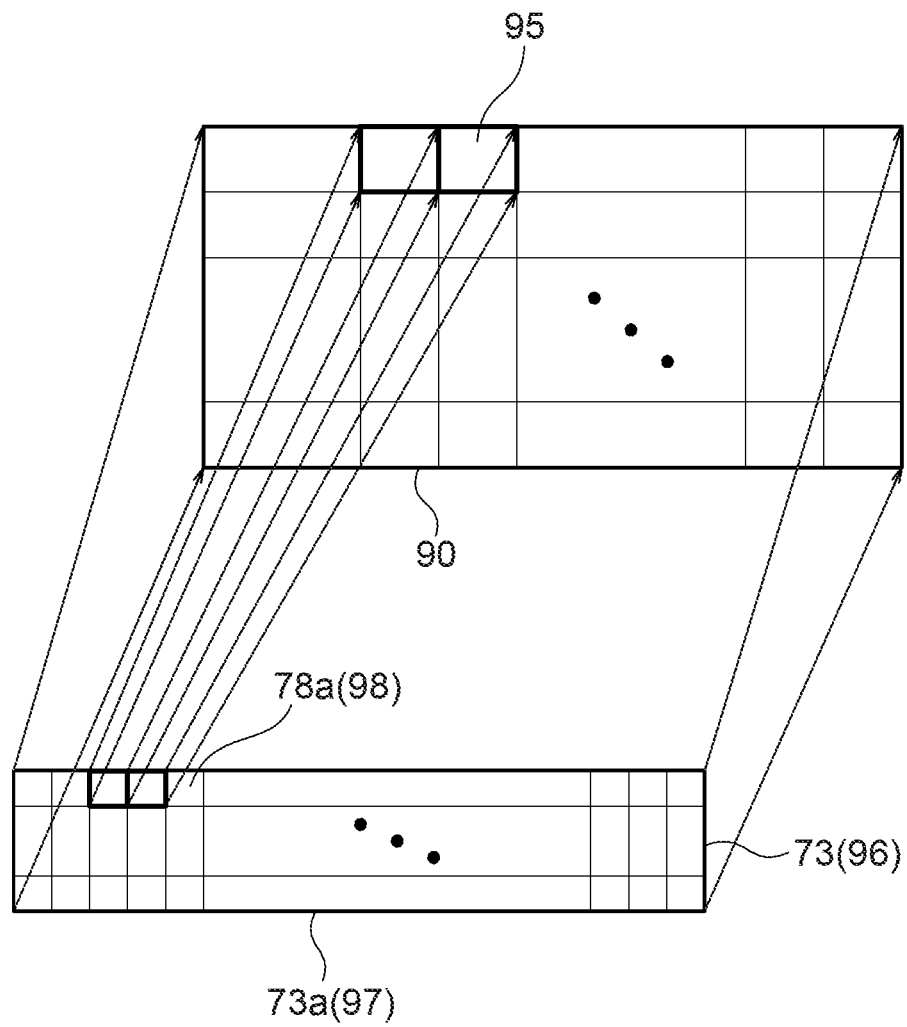
FIG. 11 is a diagram illustrating how the third coherent light, which has been diffused by the optical element in the rear illumination unit, enters an illumination area.

FIG. 11 is a diagram illustrating how the third coherent light CL3, which has been diffused by the diffusion area 73a of the optical element 73, enters the illumination area 90. As shown in FIG. 11, the third coherent light CL3 enters the diffusion area 73a. The diffusion area 73a diffuses the incident third coherent light CL3 and, as a whole, illuminates the entire illumination area 90.

As shown in FIG. 11, the diffusion area 73a is composed of a plurality of element diffusion areas 78a. Each element diffusion area 78a diffuses the incident third coherent light CL3 and illuminates a corresponding partial area 95 in the illumination area 90. At least part of the partial areas 95 differ for each element diffusion area 78a.

Such optical element 73 can be comprised of, for example, a hologram recording medium 96. As shown, for example, in FIG. 11, the hologram recording medium 96 has a hologram area 97. The hologram area 97 is provided for the third coherent light CL3.

As shown in FIG. 11, the hologram area 97 is composed of a plurality of element hologram areas 98. Each element hologram area 98 diffuses the incident third coherent light CL3, thereby illuminating a corresponding partial area 95 in the illumination area 90. At least part of the partial areas 95 that the element hologram areas 98 illuminate differ for each element hologram area 98. Thus, the partial areas 95 that the element hologram areas 98 illuminate at least partly differ from each other.

The element hologram areas 98 each have an interference pattern. The third coherent light CL3 that has entered each element hologram area 98 is diffracted by the interference pattern, and then illuminates the corresponding partial area 95 in the illumination area 90. The traveling direction of the third coherent light CL3 diffracted, or diffused by each element hologram area 98 can be changed by adjusting the interference patterns in various ways. The hologram recording medium 96 as the optical element 73 has the same construction as the hologram recording medium 66 in the front illumination units, and therefore a detailed description thereof is partly omitted.

In the rear illumination unit 3 of this embodiment having the above construction, the light scanning member 76a allows the third coherent light CL3 from the coherent light source 74 to periodically scan the diffusion area 73a of the optical element 73, and the timing controller 75 controls the timing of emission of the third coherent light CL3 in synchronization with the timing of scanning of the optical element 73 with the third coherent light CL3 by means of the light scanning member 76a.

Figure 12:
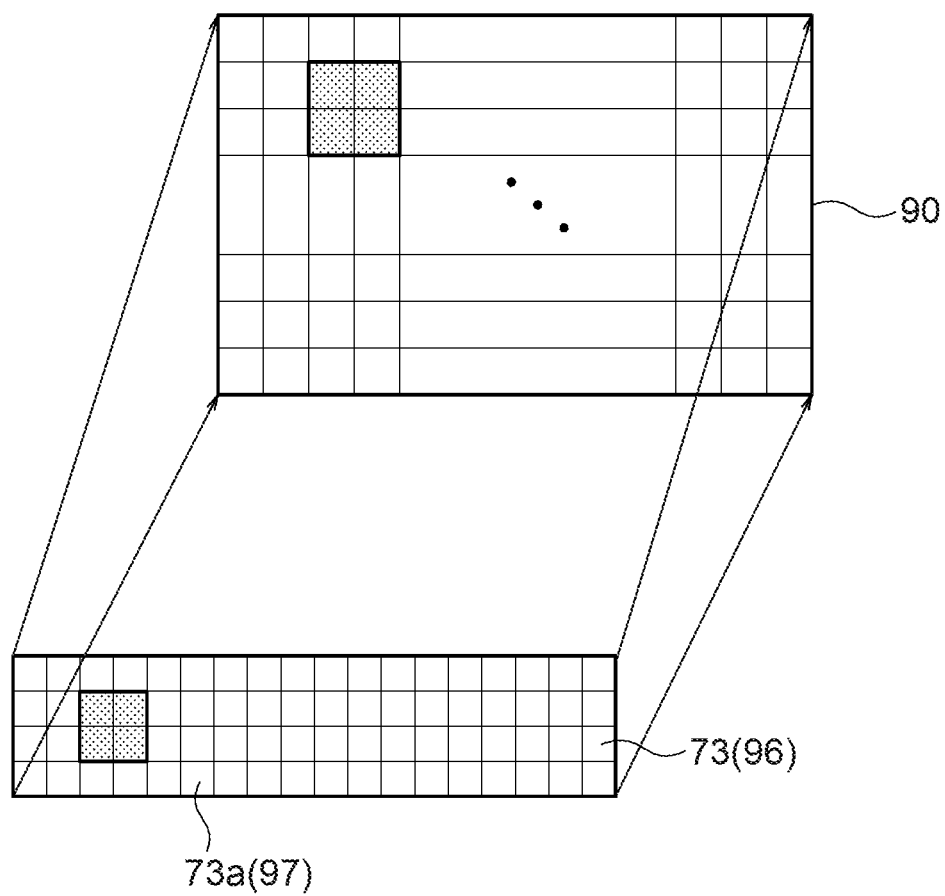
FIG. 12 is a diagram illustrating a case where any arbitrary area in the illumination area is illuminated by controlling the timing of emission of the third coherent light.

By thus controlling with the timing controller 75 whether or not to allow the third coherent light CL3 to enter the element hologram areas 98, any arbitrary area in the illumination area 90, as shown by the dotted area of FIG. 12, can be selectively illuminated. Accordingly, any arbitrary area in the predetermined rearward range S3 can be selectively illuminated. The selected partial areas 95 are illuminated or scanned in order by the third coherent light CL3 at such a high speed that the sequential illumination is perceived as simultaneous illumination by human eyes.

Among other things, according to the rear illumination unit 3, the distribution of the rearward illumination light L20 can be controlled by controlling with the timing controller 75 whether or not to allow the third coherent light CL3 to enter the element hologram areas 98 based on the direction of the eyes of the driver and/or the direction of the face of the driver, detected by the eye direction detection section 4. In particular, the rear illumination unit 3 of this embodiment is configured to control the distribution of the rearward illumination light L20 so that when the eye direction detection section 4 detects the driver viewing the rearview mirror 101, the side mirror 102L or the side mirror 102R, the rearward illumination light L20 will illuminate an area corresponding to that mirror. For example, when the driver views the rearview mirror 101, the rear illumination unit 3 can illuminate an area rearward of the automobile V, reflected in the rearview mirror 101. When the driver views the left side mirror 102L, the rear illumination unit 3 can illuminate an area an area leftward or left rearward of the automobile V, reflected in the left side mirror 102L.

The structures of the hologram recording medium 66 and the hologram recording medium 96, provided in the front illumination unit 2L and the rear illumination unit 3, respectively, will now be described in detail.

A hologram recording medium usable in this embodiment can be produced by using, for example, scattered light from a real scattering plate as object light. More specifically, when a hologram photosensitive material as a base material for the hologram recording medium is irradiated with reference light and object light, which are coherent lights coherent with each other, an interference pattern is formed on the hologram photosensitive material by the interference of the lights, whereby the hologram recording medium is produced. Laser light which is coherent light may be used as the reference light, and scattered light from e.g. an isotropic scattering plate which is available at a low cost may be used as the object light.

By emitting laser light to the hologram recording medium from the convergence position of the reference light, composed of convergent light flux and which was used in the production of the hologram recording medium, a reconstructed image of the scattering plate is formed at the disposition position of the scattering plate from which the object light originated and which was used in the production of the hologram recording medium. If the scattering plate performed uniform surface scattering, the reconstructed image of the scattering plate, obtained by using the hologram recording medium, is a uniformly surface-illuminated image. The area where the reconstructed image of the scattering plate is formed is the illumination area 40a, 40b, 90 in this embodiment.

In this embodiment, the optical elements 23, 73 are used to perform such illumination control as to illuminate only part of the illumination range. In order to perform such illumination control with the use of a hologram recording medium, it is necessary to form a complicated interference pattern on each element hologram area. Instead of forming such a complicated interference pattern by using real object light and reference light, it is possible to design such a pattern using a computer based on the wavelength and the incident direction of intended reconstruction illumination light and on the shape, the position, etc. of an image to be reconstructed. The thus-obtained hologram recording medium is also called "computer generated hologram (CGH)". It is also possible to produce, by computer generation, a Fourier transform hologram having the same diffusion angle properties at various points on each element hologram area. In the case where a diffusion angle distribution is expressed in a near-field illumination area in order to illuminate a far-field range, an optical member such as a lens may be provided in the rear of the near-field illumination area in the optical axis direction so as to set the far-field range. A Fourier transform hologram can express a diffusion pattern in terms of a diffusion angle distribution in an angular space, and therefore enables the design of a hologram which is especially useful for controlling the illumination state of long-distance illumination.

One advantage of providing a hologram recording medium as an optical element is that the light energy density of laser light can be reduced by diffusion. Another advantage is that the hologram recording medium can be used as a directional surface light source; therefore, compared to a conventional lamp light source (point light source), the luminance on a light source plane which is required to achieve the same illuminance distribution can be reduced. This can contribute to enhancement of the safety of laser light: When a person directly views irradiating light with eyes, the light is less likely to adversely affect the eyes as compared to the case of directly viewing a single point light source.

Though in this embodiment laser light from the light scanning member 26*a*, 76*a* passes through the optical element 23, 73 and is diffused by it, the optical element 23, 73 may be one that diffuses and reflects laser light. For example, in the case of using a hologram recording medium as the optical element 23, 73, the hologram recording medium may be of the reflection type or of the transmission type. In general, a reflection-type hologram recording medium (hereinafter referred to as a reflective hologram) has a higher wavelength selectivity as compared to a transmission-type hologram recording medium (hereinafter referred to as a transmissive hologram). Thus, a reflective hologram, even when interference patterns for various wavelengths are superimposed, can diffract coherent light of a desired wavelength only with a desired interference pattern. A reflective hologram is excellent also in easy elimination of the influence of 0-order light.

Examples of usable hologram recording media may include a volumetric hologram recording medium using a photopolymer, a volumetric hologram recording medium of the type that records using a photosensitive medium containing a silver salt material, and a relief (embossed) hologram recording medium.

The optical element 23, 73 is not limited to a hologram recording medium; various diffusing members that can be finely divided into element diffusion areas may be used as the optical element 23, 73. For example, the optical element 23, 73 may be composed of lens arrays, with each element diffusion area consisting of each lens array. In this case, a lens array is provided in each element diffusion area, and the shape of each lens array is designed so that each lens array illuminates a partial area in an illumination range. The positions of the partial areas at least partly differ from each other.

(Manner of Illumination by the Illumination Device)

Figure 13:
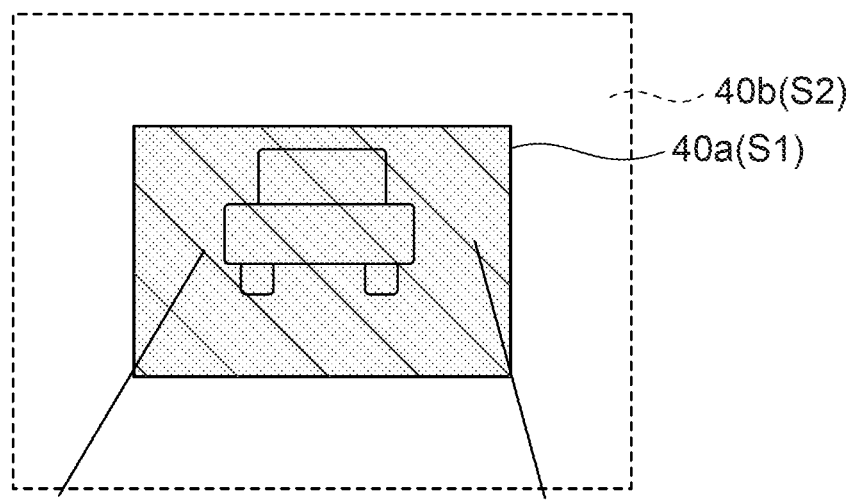
FIGS. 13A and 13B are diagrams illustrating a manner of illumination by the illumination device during normal driving of an automobile, FIG. 13A illustrating forward illumination as viewed from the automobile, and FIG. 13B illustrating the illumination as viewed from above the automobile.
Figure 13:
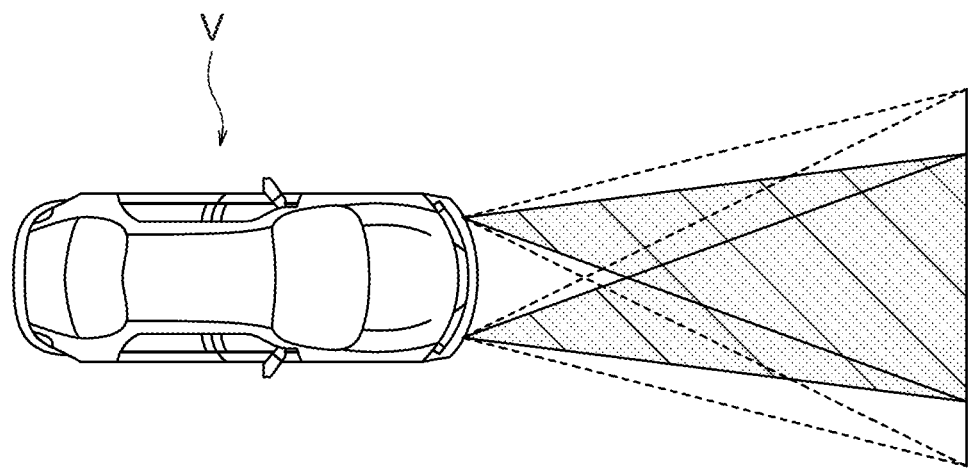
Figure 14:
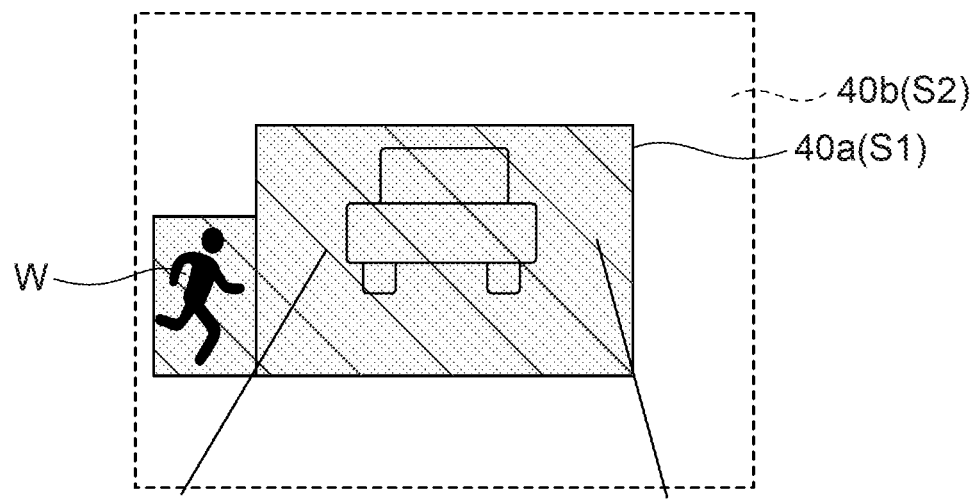
FIGS. 14A and 14B are diagrams illustrating a manner of illumination by a predetermined forward range illumination section of a front illumination unit in the illumination device, FIG. 14A illustrating forward illumination as viewed from the automobile, and FIG. 14B illustrating the illumination as viewed from above the automobile.
Figure 14:
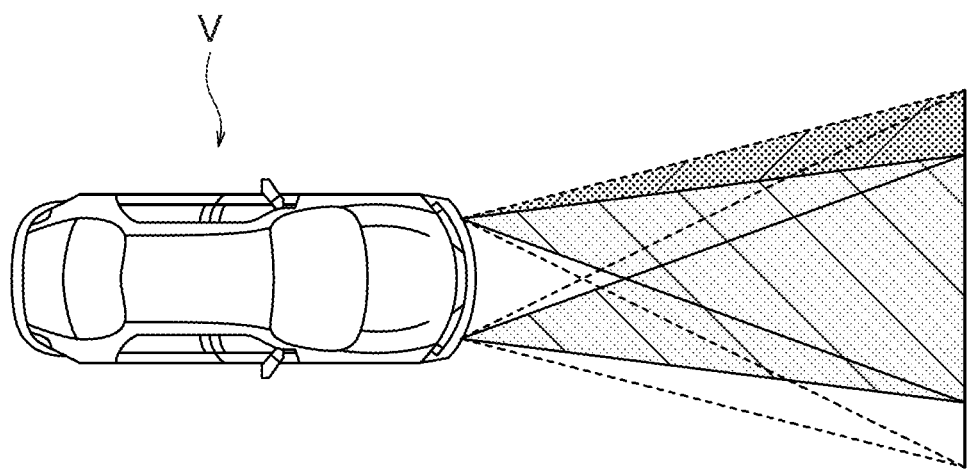
Figure 15:
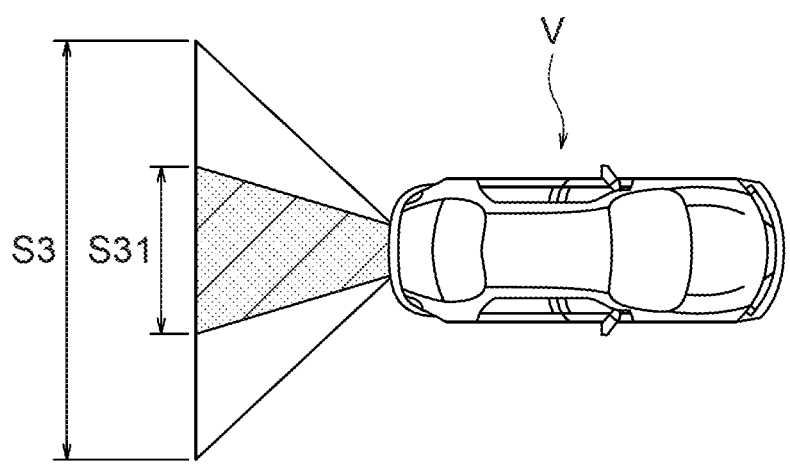
FIGS. 15A through 15C are diagrams illustrating a manner of illumination by a rear illumination unit in the illumination device.
Figure 15:
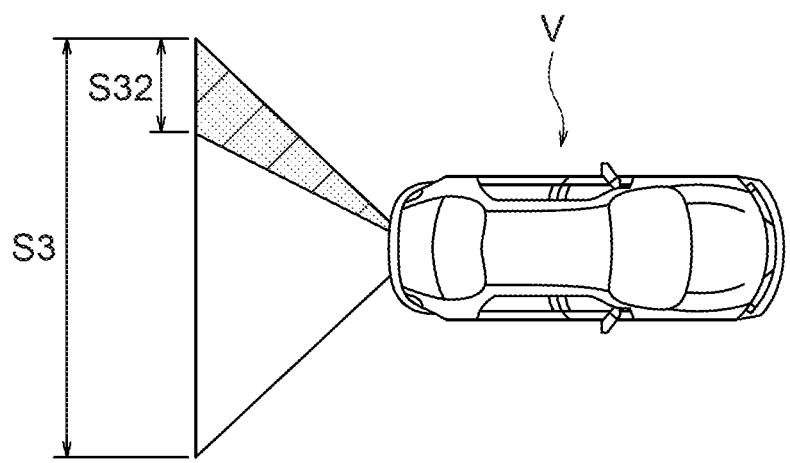
Figure 15:
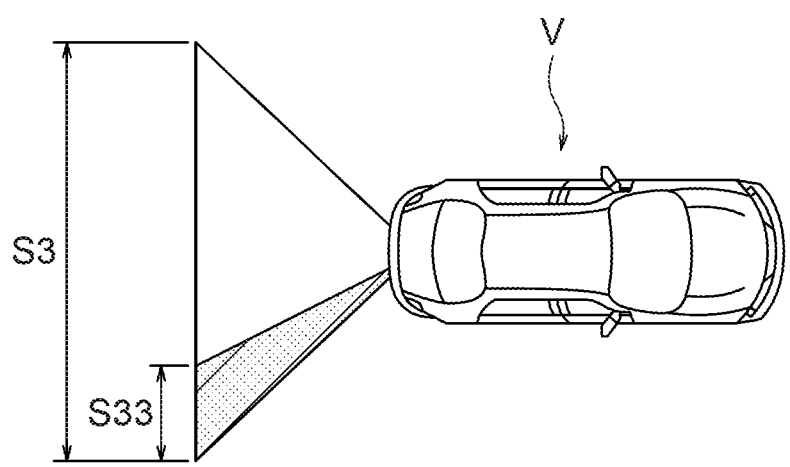

An exemplary manner of illumination by the illumination device 1 of this embodiment will now be described with reference to FIGS. 13 through 15. FIGS. 13A and 13B are diagrams illustrating a manner of illumination by the illumination device 1 during normal driving of the automobile V, FIG. 13A illustrating forward illumination as viewed from the automobile V, and FIG. 13B illustrating the illumination as viewed from above the automobile V.

In the case illustrated in FIGS. 13A and 13B, the eye direction detection section 4 detects the eyes and/or the face of the driver facing forward. In FIG. 13A, the hatched area represents an area being illustrated and in FIG. 13B, the hatched area illustrates irradiation with illumination light. In this case, the main illumination section 10L of the front illumination unit 2L in the illumination device 1 illuminates the forward main range S1, while the predetermined forward range illumination section 11L does not perform illumination. In the front illumination unit 2L, the timing controller 25 controls the timing of emission of the first coherent light CL1 so that the first coherent light CL1 will enter the entire first hologram area 67*a*. On the other hand, the timing controller 25 controls the timing of emission of the second coherent light CL2 so that the second coherent light CL2 will not enter the second hologram area 67*b*.

FIGS. 14A and 14B are diagrams illustrating a manner of illumination by the predetermined forward range illumination section 11L of the front illumination unit 2L. FIG. 14A illustrates forward illumination as viewed from the automobile V, and FIG. 14B illustrates the illumination as viewed from above the automobile V.

FIGS. 14A and 14B illustrate a manner of illumination by the predetermined forward range illumination section 11L in the case where the driver views a pedestrian W appearing left forward of the automobile V, and the eye direction detection section 4 detects the eyes and/or the face of the driver facing left forward. In FIG. 14A, the hatched area represents an area being illustrated and in FIG. 14B, the hatched area illustrates irradiation with illumination light. In this case, as shown in FIGS. 14A and 14B, the main illumination section 10L of the front illumination unit 2L in the illumination device 1 illuminates the forward main range S1, while the predetermined forward range illumination section 11L illuminates an area in which the pedestrian W lies. In order to illuminate those second partial areas 50*b* which correspond to the area in which the pedestrian W lies, the timing controller 25 controls the timing of emission of the second coherent light CL2 so that the second coherent light CL2 will enter only the corresponding particular second element hologram areas 68*b*.

The front illumination unit 2L can thus illuminate an area the driver wishes to observe. The illumination device 1 of this embodiment can therefore assist comfortable driving or steering and can improve the safety of driving or steering. When the eye direction detection section 4 detects the eyes and/or the face of the driver facing right forward, or upward and forward, the predetermined forward range illumination section 11L can, of course, illuminate an area lying in such a direction.

FIGS. 15A through 15C are diagrams illustrating a manner of illumination by the rear illumination unit 3, as viewed from above the automobile V. In the respective figure, the hatched area illustrates irradiation with illumination light.

FIG. 15A illustrates a manner of illumination by the rear illumination unit 3 in the case where the eye direction detection section 4 detects the driver viewing the rearview mirror 101. In this case, the rear illumination unit 3 illuminates a central range S31 of the predetermined rearward range S3. In order to illuminate those partial areas 95 which correspond to an area reflected in the rearview mirror 101, the timing controller 75 controls the timing of emission of the third coherent light CL3 so that the third coherent light CL3 will enter only the corresponding particular element hologram areas 98.

FIG. 15B illustrates a manner of illumination by the rear illumination unit 3 in the case where the eye direction detection section 4 detects the driver viewing the left side mirror 102L. In this case, the rear illumination unit 3 illuminates a left range S32 of the predetermined rearward range S3. In order to illuminate those partial areas 95 which correspond to an area reflected in the left side mirror 102L, the timing controller 75 controls the timing of emission of the third coherent light CL3 so that the third coherent light CL3 will enter only the corresponding particular element hologram areas 98.

FIG. 15C illustrates a manner of illumination by the rear illumination unit 3 in the case where the eye direction detection section 4 detects the driver viewing the right side mirror 102R. In this case, the rear illumination unit 3 illuminates a right range S33 of the predetermined rearward range S3. In order to illuminate those partial areas 95 which correspond to an area reflected in the right side mirror 102R, the timing controller 75 controls the timing of emission of the third coherent light CL3 so that the third coherent light CL3 will enter only the corresponding particular element hologram areas 98.

Thus, the rear illumination unit 3 can also illuminate an area the driver wishes to observe. The illumination device 1 of this embodiment can therefore assist comfortable driving or steering and can improve the safety of driving or steering.

According to the illumination device 1 of this embodiment, the front illumination unit 2L and the rear illumination unit 3 control the distribution of illumination light based on the direction of the eyes of the driver and/or the direction of the face of the driver, detected by the eye direction detection section 4. In particular, the predetermined forward range illumination section 11L of the front illumination unit 2L controls the distribution of the forward sub illumination light L11 so that it will illuminate an area, lying in the direction of the eyes of the driver and/or the direction of the face of the driver detected by the eye direction detection section 4, in the predetermined forward range S2. On the other hand, the rear illumination unit 3 controls the distribution of the rearward illumination light L20 so that when the eye direction detection section 4 detects the driver viewing the rearview mirror 101, the side mirror 102L or the side mirror 102R, the rearward illumination light L20 will illuminate an area reflected in that mirror. The illumination device 1 of this embodiment can therefore assist comfortable driving or steering and can improve the safety of driving or steering.

In addition to the predetermined forward range illumination section 11L, the front illumination unit 2L of this embodiment includes the main illumination section 10L which illuminates the forward main range S1 by emitting the forward main illumination light L1 forward from the automobile V. The predetermined forward range illumination section 11L illuminates the predetermined forward range S2 set outside the forward main range S1. Thus, while the main illumination section 10L is illuminating the forward main range S1, the predetermined forward range illumination section 11L can illuminate, as necessary, an area lying outside the forward main range S1 and which the driver wishes to observe. This makes it possible to effectively illuminate an area forward of the automobile V.

In this embodiment the forward main range S1 is set at a range that meets a predetermined light distribution standard. Therefore, while illuminating the minimal area forward of the automobile V, an area the driver wishes to observe can be illuminated in a flexible manner in the predetermined forward range S2 that does not meet any light distribution standard.

The predetermined forward range illumination section 11L of the front illumination unit 2L includes the optical element 23 having the second diffusion area 23b which diffuses the second coherent light CL2 from the second light source section 24b of the coherent light source 24 and emits the forward sub illumination light L11, thereby illuminating the predetermined forward range S2. The second diffusion area 23b of the optical element 23 is composed of the plurality of second element diffusion areas 28b. Each second element diffusion area 28b diffuses the incident second coherent light CL2 and illuminates a corresponding second partial area 50b in the second illumination area 40b. At least part of the second partial areas 50b, illuminated by the second element diffusion areas 28b, differ from each other. The predetermined forward range illumination section 11L controls the distribution of the forward sub illumination light L11 by controlling whether or not to allow the second coherent light CL2 to enter the second element diffusion areas 28b.

An area to be illuminated can be easily changed by thus controlling whether or not to allow the second coherent light CL2 to enter the second element diffusion areas 28b.

In particular, in the predetermined forward range illumination section 11L of this embodiment, the timing controller 25 controls the timing of emission of the second coherent light CL2 and thus the timing of incidence of the second coherent light CL2 on the optical element 23 in synchronization with the timing of scanning of the optical element 23 with the second coherent light CL2 by means of the light scanning member 26a, thereby controlling whether or not to allow the second coherent light CL2 to enter the second element diffusion areas 28b. The incident angle of the coherent light CL2, which enters various positions in an element diffusion area 28b over time, changes over time. This can obscure speckles in the second illumination area 40b. In this embodiment the rear illumination unit 3 has the same construction as the predetermined forward range illumination section 11L. Thus, as with the above-described predetermined forward range illumination section 11L, the rear illumination unit 3 can easily change an area to be illuminated and can obscure speckles in the illumination area 90.

In this embodiment the front illumination unit 2L is configured as a illumination unit in which the main illumination section 10L for illuminating the forward main range S1 and the predetermined forward range illumination section 11L for illuminating the predetermined forward range S2 are unified. In order to unify the main illumination section 10L and the predetermined forward range illumination section 11L, the front illumination unit 2L includes: the coherent light source 24 including the first light source section 24a for emitting the first coherent light CL1, and the second light source section 24b for emitting the second coherent light CL2; the timing controller 25 for individually controlling the first coherent light CL1 and the second coherent light CL2; the optical element 23 having the first diffusion area 23a which the first coherent light CL1, which is controlled by the timing controller 25, enters and the second diffusion area 23b which the second coherent light CL2, which is controlled by the timing controller 25, enters; and the light scanning member 26a for allowing the first coherent light CL1 from the coherent light source 24 to scan the first diffusion area 23a, and allowing the second coherent light CL2 from the coherent light source 24 to scan the second diffusion area 23b.

Such construction can achieve size reduction of the front illumination unit 2L. The main illumination section 10L can also flexibly change the manner of illumination so as to perform effective illumination. It is also possible to provide the main illumination section 10L and the predetermined forward range illumination section 11L of the front illumination unit 2L as separate apparatuses.

Various changes and modifications may be made to the embodiments described above.

Figure 16:
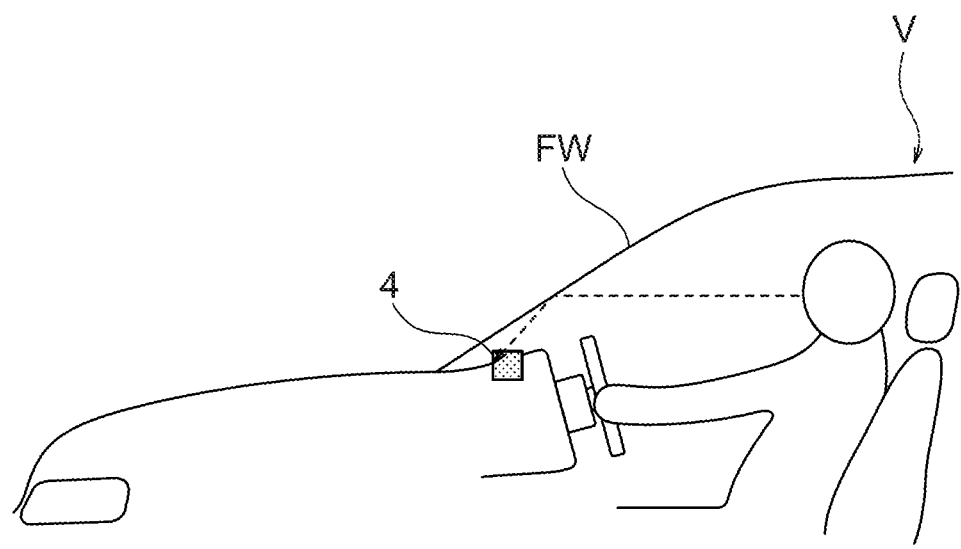
FIG. 16 is a diagram illustrating a variation of the installation position of the eye direction detection section.

For example, FIG. 16 is a diagram illustrating a variation of the installation position of the eye direction detection section 4. As shown in FIG. 16, in this variation the eye direction detection section 4 is installed at an upper portion of a dashboard located below a front window FW disposed in front of the driver. In this embodiment the eye direction detection section 4 detects the direction of the eyes of the driver and/or the direction of the face of the driver based on a shot image of the face of the driver reflected in the front window FW. In this variation the eye direction detection section 4 is disposed at the obscure position. This can avoid complication of the interior of the automobile.

Though in the above-described embodiment the light source of the predetermined forward range illumination section 11L is a coherent light source, the light source may be, for example, an LED light source. In the above-described embodiment the predetermined forward range illumination section 11L is capable of illuminating the predetermined forward range S2, and can illuminate a partial area in the range S2 depending on detection by the eye direction detection section 4. However, instead of this manner of illumination, it is possible to use a manner in which a desired area is illuminated by swinging the light source depending on detection by the eye direction detection section 4. It is also possible to switch on/off the light source depending on detection by the eye direction detection section 4. In particular, it is possible to provide a light source for illuminating a predetermined range rearward of a mobile object, and to switch on/off the light source depending on detection by the eye direction detection section 4. In the predetermined forward range illumination section 11L of the above-described embodiment, the light scanning member 26a allows the first coherent light CL1 from the coherent light source 24 to scan the first diffusion area 23a of the optical element 23, and allows the second coherent light CL2 from the coherent light source 24 to scan the second diffusion area 23b of the optical element 23. However, it is possible not to provide the light scanning member 26a, and to use, as the coherent light source 24, a laser array of a plurality of element light source sections (laser light source sections) which each emit coherent light. In particular, the coherent light source 24 may include a first laser array that allows coherent light to enter the first diffusion area 23a, and a second laser array that allows coherent light to enter the second diffusion area 23b. The element light source sections of the first laser array allow coherent light to enter different first element diffusion areas 28a of the first diffusion area 23a, and the element light source sections of the second laser array allow coherent light to enter different second element diffusion areas 28b of the second diffusion area 23b. The use of such light source 24 can also perform control of the distribution of light, e.g. to partly illuminate only a desired area, by selectively switching on/off the element light source sections. The laser array construction described here can also be applied in the rear illumination unit 3.

Though in the above-described embodiment the illumination device 1 is installed in the automobile V as a mobile object, the illumination device 1 may be applied in other mobile objects such as a motorcycle, an air vehicle such as an aircraft, a train, a ship, a submersible object, etc. The illumination range of the illumination device 1 is not limited to the above-described range. For example, it is possible to provide a illumination section capable of illuminating an area sideward of a mobile body, and to control the distribution or on/off of illumination light of the illumination section depending on detection by the eye direction detection section 4.

The invention claimed is:

1. An illumination device installed in a mobile object, the illumination device comprising:
a predetermined range illumination section capable of illuminating a predetermined range with illumination light emitted from the mobile object;
wherein the illumination device detects a direction of eyes of a driver of the mobile object and/or a direction of a face of the driver, wherein the predetermined range illumination section controls the distribution of the illumination light or the on/off of the illumination light based on the detected direction of the eyes of the driver and/or the detected direction of the face of the driver; and
a main illumination section for illuminating a forward main range by emitting forward main illumination light forward from the mobile object;
wherein the predetermined range illumination section controls the distribution of the illumination light or the on/off of the illumination light so that the illumination light illuminates an area, lying in the detected direction of the eyes of the driver and/or the detected direction of the face of the driver, in the predetermined range;
wherein the predetermined range illumination section illuminates the predetermined range, which is set outside the forward main range, by emitting the illumination light forward from the mobile object; and
wherein the illumination device is configured as an illumination unit including the main illumination section and the predetermined range illumination section, wherein the illumination unit includes a coherent light source including a first light source section for emitting first coherent light, and a second light source section for emitting second coherent light, and an optical element having a first diffusion area which the first coherent light enters, and a second diffusion area which the second coherent light enters, wherein the first light source section and the first diffusion area constitute the main illumination section, and the first diffusion area diffuses the first coherent light and emits the forward main illumination light, thereby illuminating the forward main range, wherein the second light source section and the second diffusion area constitute the predetermined range illumination section, and the second diffusion area diffuses the second coherent light and emits the illumination light, thereby illuminating the predetermined range, wherein the second diffusion area is composed of a plurality of second element diffusion areas which each diffuse the incident second coherent light, thereby illuminating a second partial area in the predetermined range, and at least part of the second partial areas to be illuminated by the second element diffusion areas differ from each other, and wherein the predetermined range illumination section controls the distribution of the illumination light in the predetermined range by controlling whether or not to allow the second coherent light from the coherent light source to enter the second element diffusion areas, or by controlling whether or not to allow the illumination light from the second element diffusion areas to enter the predetermined range.

2. The illumination device according to claim 1, wherein the optical element is a hologram recording medium, and wherein the second element diffusion areas are element hologram areas having different interference patterns.

3. The illumination device according to claim 1, wherein the first diffusion area is composed of a plurality of first element diffusion areas which each diffuse the incident first coherent light, thereby illuminating a first partial area in the forward main range, and at least part of the first partial areas to be illuminated by the first element diffusion areas differ from each other, and wherein the main illumination section controls the distribution of the forward main illumination light in the forward main range by controlling whether or not to allow the first coherent light from the coherent light source to enter the first element diffusion areas, or by controlling whether or not to allow the forward main illumination light from the first element diffusion areas to enter the forward main range.

4. The illumination device according to claim 3, wherein the illumination unit further includes a timing controller that individually controls the timings of incidence of the first coherent light and the second coherent light on the optical element or the timings of illumination of the predetermined range and the forward main range.

5. The illumination device according to claim 4, further comprising a scanning section for allowing the first coherent light and the second coherent light, emitted by the coherent light source, to scan the optical element.

6. The illumination device according to claim 5, wherein the scanning section includes a light scanning member for periodically changing the traveling directions of the first coherent light and the second coherent light, emitted by the coherent light source.

7. The illumination device according to claim 6, wherein the light scanning member allows the first coherent light from the coherent light source to periodically scan the first diffusion area of the optical element and allows the second coherent light from the coherent light source to periodically scan the second diffusion area of the optical element, and wherein the timing controller controls the timings of emission of the first coherent light and the second coherent light and thus the timings of incidence of the first coherent light and the second coherent light on the optical element in synchronization with the timings of scanning of the optical element with the first coherent light and the second coherent light by means of the light scanning member, thereby controlling whether or not to allow the first coherent light to enter the first element diffusion areas, and controlling whether or not to allow the second coherent light to enter the second element diffusion areas.

* * * * *